US012249949B1

(12) United States Patent
Jasmin et al.

(10) Patent No.: US 12,249,949 B1
(45) Date of Patent: Mar. 11, 2025

(54) RAILLESS MOUNTING SYSTEM AND DEVICES FOR ATTACHING SOLAR MODULES TO ROOFS

(71) Applicant: Sunmodo Corporation, Vancouver, WA (US)

(72) Inventors: Roland Jasmin, Vancouver, WA (US); Steve Mumma, Oregon City, OR (US); Jun Liu, Camas, WA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/915,351

(22) Filed: Oct. 15, 2024

Related U.S. Application Data

(63) Continuation of application No. 18/763,527, filed on Jul. 3, 2024, now Pat. No. 12,149,200.

(51) Int. Cl.
*H02S 20/23* (2014.01)
(52) U.S. Cl.
CPC .................................. *H02S 20/23* (2014.12)
(58) Field of Classification Search
None
See application file for complete search history.

(56) References Cited

U.S. PATENT DOCUMENTS

| | | | |
|---|---|---|---|
| 12,057,801 B1* | 8/2024 | Jasmin | H02S 20/23 |
| 2013/0161462 A1* | 6/2013 | Haddock | F16B 2/12 |
| | | | 248/237 |
| 2022/0393636 A1* | 12/2022 | Affentranger, Jr. | H02S 20/23 |
| 2023/0155536 A1* | 5/2023 | Affentranger, Jr. | H02S 30/10 |
| | | | 52/173.3 |
| 2023/0228372 A1* | 7/2023 | Stephan | F24S 25/636 |
| | | | 29/525.01 |
| 2024/0146233 A1* | 5/2024 | Myers | H02S 20/23 |
| 2024/0154565 A1* | 5/2024 | Affentranger, Jr. | F24S 25/30 |
| 2024/0227688 A1* | 7/2024 | Morano | F24S 25/613 |

* cited by examiner

*Primary Examiner* — Steven M Marsh
(74) *Attorney, Agent, or Firm* — Stone Creek Services LLC; Alan M Flum

(57) ABSTRACT

Devices, systems, and methods for attaching solar modules to roofs. The devices may include a module hook clamp with a clamp body with clamp body arms extending upward from a clamp body base. The clamp body arms may include downward-facing hooks that engage a portion of the solar module's return flange and the outward-facing surface of the solar module. A spacer may optionally be positioned between the clamp body arms. The spacer may seat the solar module. A hook arm with a generally curve-shaped seating surface may extend below the clamp body base. The devices may further include a module attachment bracket that secures a second solar module in a similar manner as the module hook clamp. The module attachment bracket may include a platform that seats the hook arm of the module hook clamp, and a hook arm receiver that receives and secures the open end of the hook arm.

14 Claims, 44 Drawing Sheets

RAILLESS MOUNTING SYSTEM AND DEVICES FOR ATTACHING SOLAR MODULES TO ROOFS

CROSS-REFERENCES

This application is a continuation of U.S. patent application Ser. No. 18/763,527, filed on Jul. 3, 2024. The contents of U.S. patent application Ser. No. 18/763,527 are hereby incorporated by reference.

BACKGROUND

This application relates to structures and related devices for mounting solar energy collecting apparatus, such as solar modules, that may be attached to or integrated into static structures, such as buildings and roof tops.

Solar modules, or solar panels, are often mounted to building roof tops using solar "mounting" or "racking" systems. These mounting systems can be rail-based or railless. Some roof tops are sloped or "pitched," to help shed rain. Both rail-based and railless mounting systems can accommodate pitched roofs.

Rail-based mounting systems use rails to support the solar modules. Module clamps typically secure the solar modules to the rails. The rails may be secured to the building surface, or roof top, using L-brackets.

Railless mounting systems do not use rails. Instead, railless mounting assemblies attach directly to the solar modules and the roof. Because they do not use rails, railless mounting assemblies typically require less mounting hardware than rail-based systems.

SUMMARY

The Inventors recognized that while railless mounting systems generally use less mounting hardware than rail-based systems, the railless mounting assemblies can be structurally complex. They can also be difficult to install, requiring pre-planning and complex adjustment. The number of components in a large residential or commercial installation can exacerbate these problems. For example, a 40-module residential system may use 400 railless mounting assemblies, while a 100-module commercial system may use 1000 railless mounting assemblies The Inventors' solar module mounting system, and associated devices, solves these problems. The system integrates with solar modules that have solar module frames, which include a first detent in the outward-facing surface of their frame and a second detent extending from the return flange of the solar module frame. An example of a solar module using a frame with these features is the subject of U.S. patent application Ser. No. 18/122,044 filed on Mar. 15, 2023 by the Applicant, and now U.S. Pat. No. 11,757,400, issued on Sep. 12, 2023. The contents of U.S. patent application Ser. No. 18/122,044 and U.S. Pat. No. 11,757,400 are hereby incorporated by reference.

Integrating the solar module mounting system with solar module frames as described above, simplifies the structure of mounting components and devices. For example, the mounting components share structure that allows them to snap into detents in the solar module frame by spring tension without the use of tools. The mounting components may be pre-attached to the solar module before the resulting solar module assembly is positioned and secured to the roof. In contrast, a typical solar module system requires that the mounting component first be attached to the roof and then the solar modules be aligned and attached to the mounting components. This requires somewhat precise measurement and pre-calculation and are prone to error. The present system, on the other hand, may be mounted directly to the roof. An installer may opt to use a reference, such as a chalk line to align the first row of solar module assemblies to the roof. Because the mounting components are pre-attached to the solar modules, there is little or no chance of misalignment.

The mounting components include module-roof attachment assemblies, module hook clamps, skirt clamps, and skirt splices. Each module-roof attachment assembly includes a module attachment bracket that secures to the solar module frame as described above, and a roof attachment bracket that secures the module attachment bracket to the roof. The roof attachment bracket is typically an L-foot or L-bracket, but can be other types of roof attachment brackets. The module attachment bracket may be an end-clamp type or a universal-type. The end-clamp type module attachment bracket is structured to attach to the leading edge or the trailing edge of the solar module assembly. The leading edge of the solar module assembly is typically the outside edge of the assembly that faces the lower roof line. The trailing edge of the solar module assembly is typically the outside edge of the assembly that faces the upper roof line or roof ridge. The universal-type module attachment bracket can attach to the trailing edge of each module as well as the leading edge of the first-row of solar module assemblies. Mid-clamp type module attachment brackets attach to the trailing-edge of interior-row solar module assemblies.

An installer will typically pre-install module-roof attachment assemblies to the leading and trailing edge of solar module assemblies, positioned in the first row of solar modules, by snapping them onto the solar module frames by spring tension. As an example, of a typical assembly procedure, the installer will typically make a reference line on the roof, for example, a chalk line. They will then place the leading edge of the first row of solar modules onto the roof parallel to the reference line. Once positioned on the roof, the installer will secure each first-row solar module assembly to the roof.

For the modules in each subsequent row, the installer may pre-install module hook clamps on the leading edge of each solar module, and module-roof attachment assemblies on their trailing edges. The installer than aligns and attaches the resulting assemblies to the first row of modules by placing a hook arm of the module hook clamp onto a platform of the module attachment bracket. The open end of the hook arm engages the module attachment bracket's hook arm receiver. The installer than rotates the module until its trailing-edge module-roof attachment assemblies engage the roof surface. The installer then secures these roof attachment brackets to the roof. Each solar module assembly in the row is attached in the same way as is each subsequent row.

The module attachment bracket described above may include a bracket body, a threaded fastener, and optionally, a spacer. The bracket body may include a bracket body base and platform extending away from the bracket body base, and a hook arm receiver extending from the bracket body. The hook arm receiver includes an end portion extending toward the platform. Bracket body arms extend upward from the bracket body base. The bracket body arms include hooks that extend downward toward the bracket body base. These hooks secure, by spring tension, to detents in the solar module frame's outside-facing surface and return flange end.

Optionally, the spacer may be removably positionable between the bracket body arms. The spacer can be positioned so that the spacer seats against the solar module while the hooks secure the solar module to the solar module frame's detents. The threaded fastener extends through one of the bracket body arms, through the spacer and threadedly engages the other bracket body arm. The threaded fastener tightens the hooks against the detents in the solar module frame. The spacer prevents damage to the frame by preventing overtightening of the fastener. The bracket body may optionally include a spacer stop that extends from one of the bracket body arms. The bottom surface of the spacer may seat against the spacer stop. The spacer stop prevents rotation of the spacer from tightening the threaded fastener.

The module attachment bracket together with a roof attachment bracket, such as an L-foot, form a module-roof attachment assembly. The L-foot may include an L-foot base that attaches to the roof and a L-foot riser that attaches to a bracket body riser of the module attachment bracket.

The module hook clamp discussed above, may include a clamp body, a threaded fastener, and optionally a spacer. The clamp body may include a clamp body base and clamp arms extending upward from the clamp body base. Hooks may extend downward from the ends of the hook arms. These hooks are structured to clamp to detents in the solar module frame. The clamp body may also include a hook arm that extends away from the clamp body, and from below the clamp body base. The hook arm includes an open end and a generally curve-shaped seating surface. The generally curve-shaped seating surface may be a downward-facing generally convex shape. The hook arm may further include a ball hook catch extending from the open end to help facilitate capture and retention by the hook arm receiver. Shapes other than a ball hook catch, for example a half-arc, might also facilitate capture and retention of the hook arm receiver.

Optionally, the spacer may be removably positionable between the clamp body arms. The spacer can be positioned as previously described. A threaded fastener extends through one of the clamp body arms, through the spacer and threadedly engages the other clamp body arm and prevents overtightening as previously discussed. The spacer stop prevents rotation of the spacer from tightening the threaded fastener.

An installer may attach a skirt around the perimeter of the solar module assembly for aesthetics and architectural appeal. The skirt can help provide a unified appearance and may help protect the underside of the assembly from driving rain and wind uplift. The skirt clamps may include arms extending from a base with hooks that engage detents in the solar module as previously discussed. The skirt clamp may also optionally include a spacer that seats the solar module frame and prevents over tightening, as previously described. The skirt clamp is structured to extend away from the outward-facing surface of the solar module frame with grooves that receive tongues in the skirt.

This Summary discusses various examples and concepts. These do not limit the inventive concept. Other features and advantages can be understood from the Detailed Description, figures, and claims.

DETAILED DESCRIPTION

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as "either," which signals an "exclusive or." As used throughout this disclosure, "comprise," "include," "including," "have," "having," "contain," "containing" or "with" are inclusive, or open ended, and do not exclude unrecited elements.

The Detailed Description includes the following sections: "Definitions," "Overview and Common Features," "Components," "Example Assembly Method," and "Conclusion and Variations."

Definitions

Return flange: As defined in this disclosure, a return flange is the lower lip of a solar module frame that projects inward underneath the solar module.

Solar module assembly: As defined in this disclosure, a solar module assembly includes a solar module that is pre-assembled with module-roof attachment assemblies necessary for attaching the solar module to a roof or building structure.

Overview and Common Features

Figure 1:
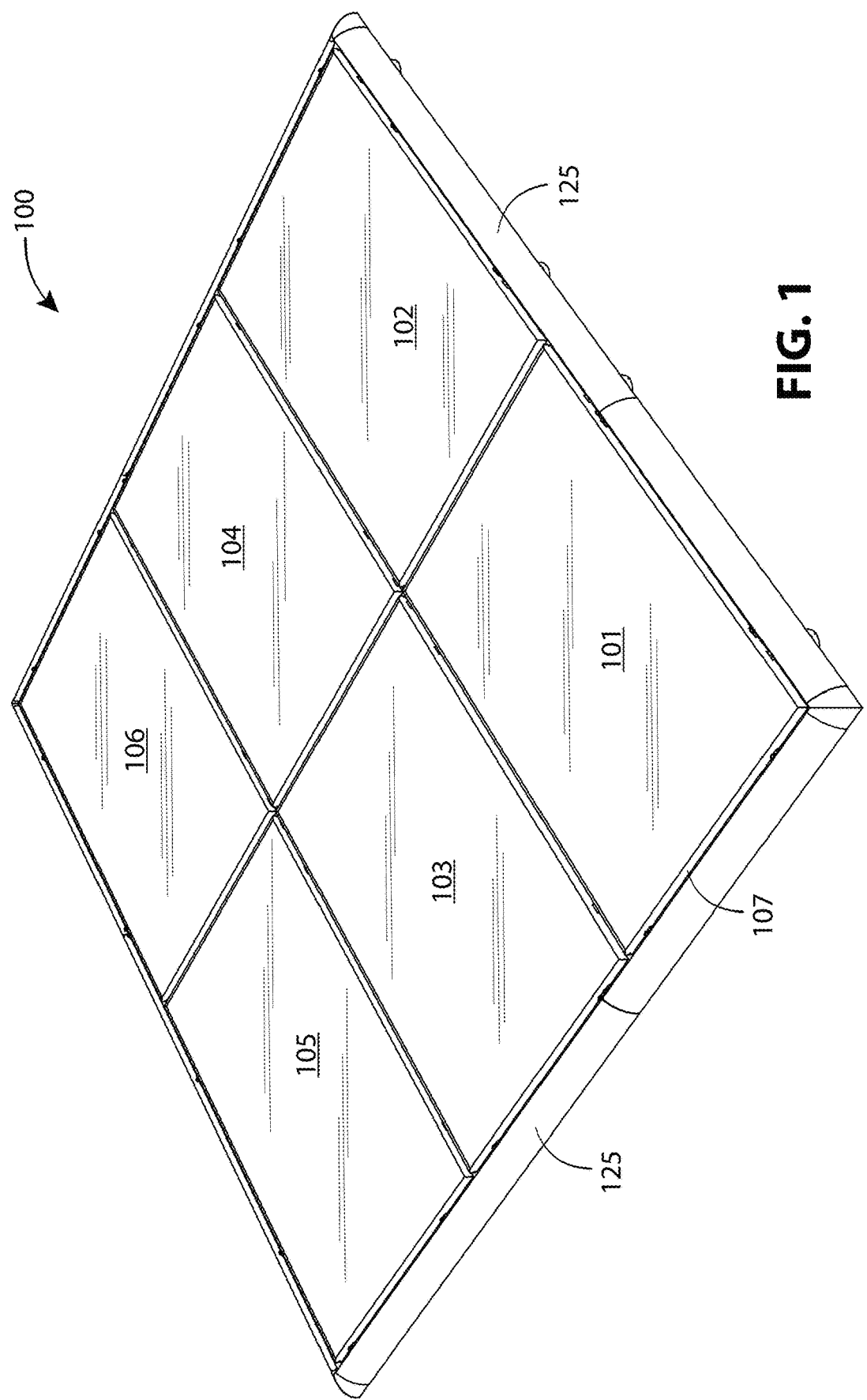
FIG. 1 illustrates, in perspective view, a simplified version of a solar module assembly of the present disclosure.
Figure 2:
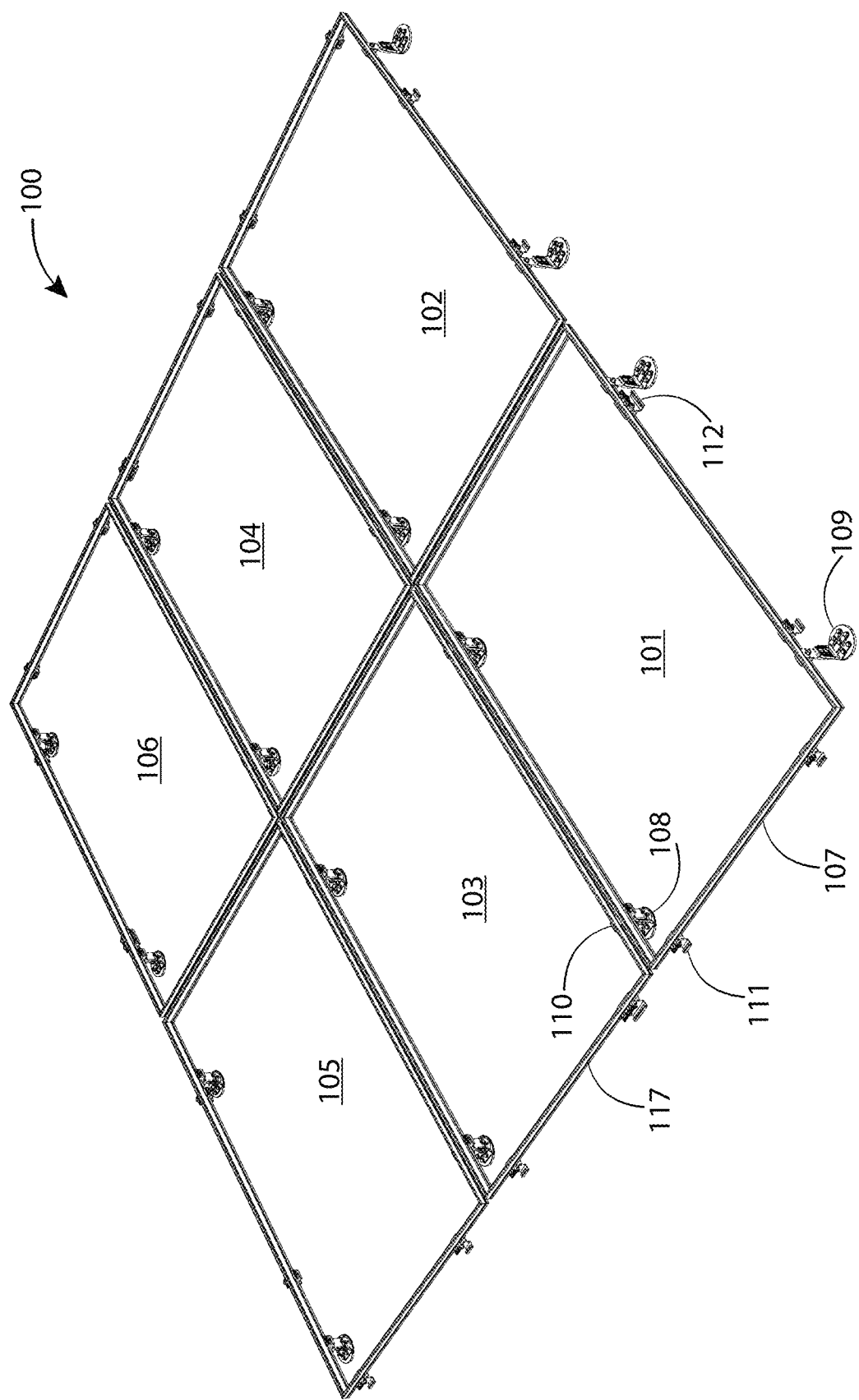
FIG. 2 illustrates, in perspective view, the solar module assembly of FIG. 1 with the top surface of the solar modules shown as transparent (i.e., x-ray view) to reveal the mounting structure underneath.
Figure 3:
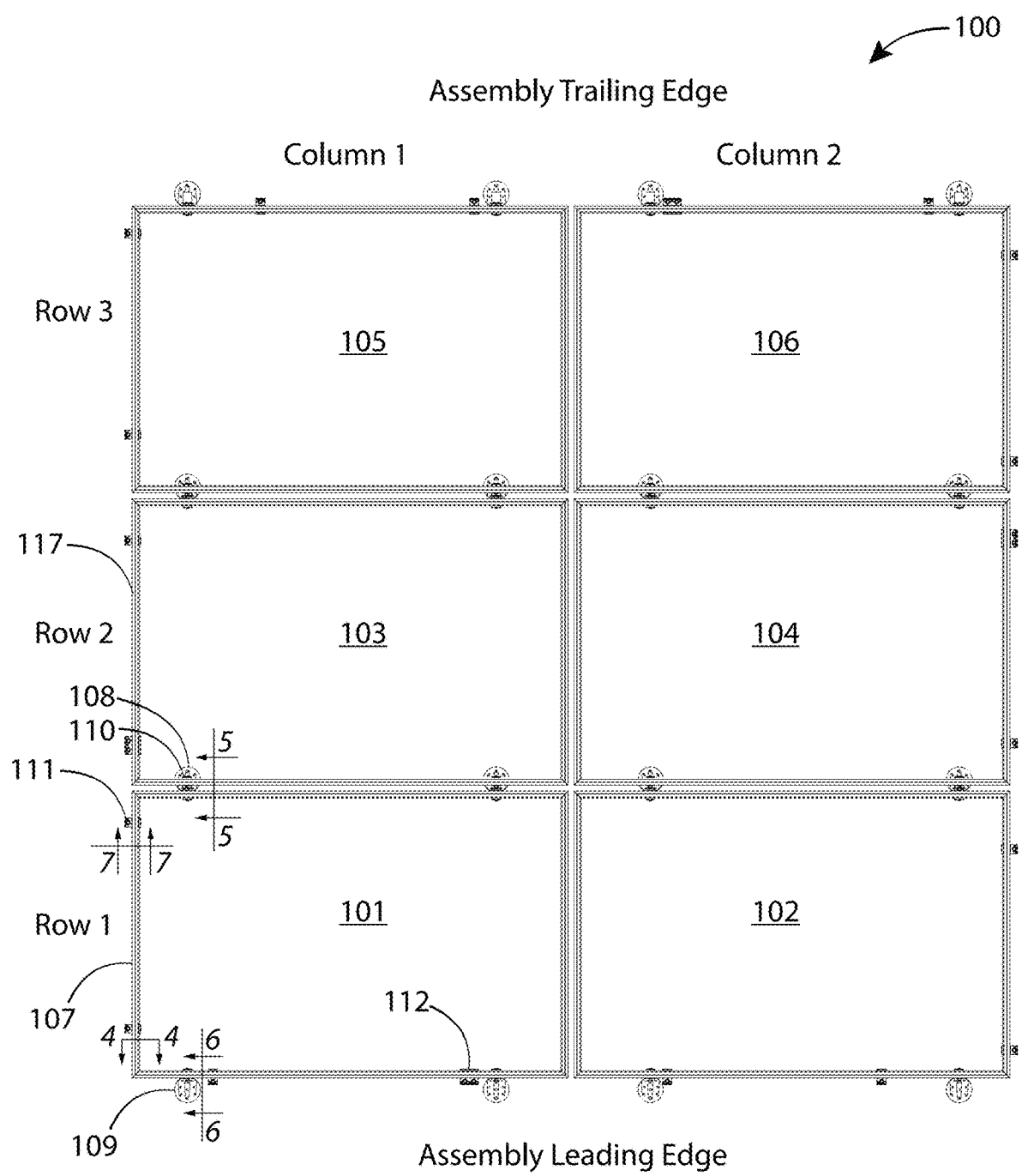
FIG. 3 illustrates the assembly of FIG. 1, in top view, with the top surface of the solar modules show as transparent to reveal the mounting structure underneath.

As discussed in the Summary, the Inventors recognized that while railless systems generally use less mounting hardware than rail-based systems, the railless mounting assemblies can be structurally complex. They can also be difficult to install, requiring pre-planning and complex adjustment. The Inventors' railless solar module system solves these problems. FIGS. 1-3 illustrate a solar module system 100 that represents a simplified version of the Inventors' system. For simplicity, FIGS. 1-3 illustrate solar module system 100 with six solar modules, solar module 101, 102, 103, 104, 105, 106, arranged in three rows and two columns. Using the principles discussed in this disclosure, an installer or system architect may scale the solar module system 100 as large as needed. For example, a residential system with fifty solar modules could include five rows and ten columns.

FIGS. 2 and 3 are shown in "x-ray" view with the solar module top surface made transparent to reveal system components and devices. Referring to FIGS. 2 and 3, these components and devices include module-roof attachment assembly 108, module-roof attachment assembly 109, skirt clamp 111, and skirt splice 112, which are attached to solar module frame 107 and module hook clamp 110, which is attached to solar module frame 117.

Figure 4:
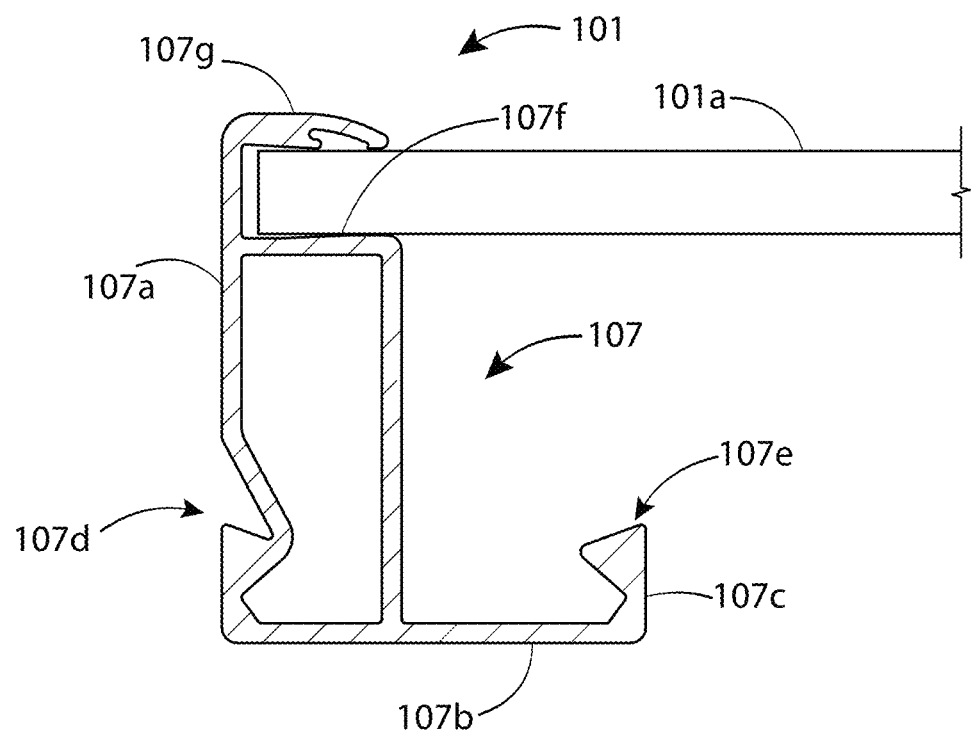
FIG. 4 illustrates a section view of the solar module frame taken along section lines 4-4 in FIG. 3.

To simplify assembly and the structural complexity of components and devices, the solar module system 100 integrates with solar modules that include a first detent in the outward-facing surface of their frame and a second detent extending from the return flange of their frame. For example, the solar module frame 107 of FIGS. 1-3 includes these detent structures. FIG. 4 shows a section view of solar module 101 from FIG. 3, taken along section lines 4-4. Referring to FIG. 4, the solar module frame 107 of the solar module 101 includes a first detent 107d extending into the outward-facing surface 107a of the solar module frame 107. A second detent 107e is positioned on an upward-projected portion 107c projected upward from the return flange 107b. The second detent 107e and upward-projected portion 107c form a return flange end. The second detent may extend inward and downward toward the outward-facing surface. The solar module top 101a (i.e., cells and substrate) are seated between the frame top 107g and the module shelf 107f.

Figure 5:
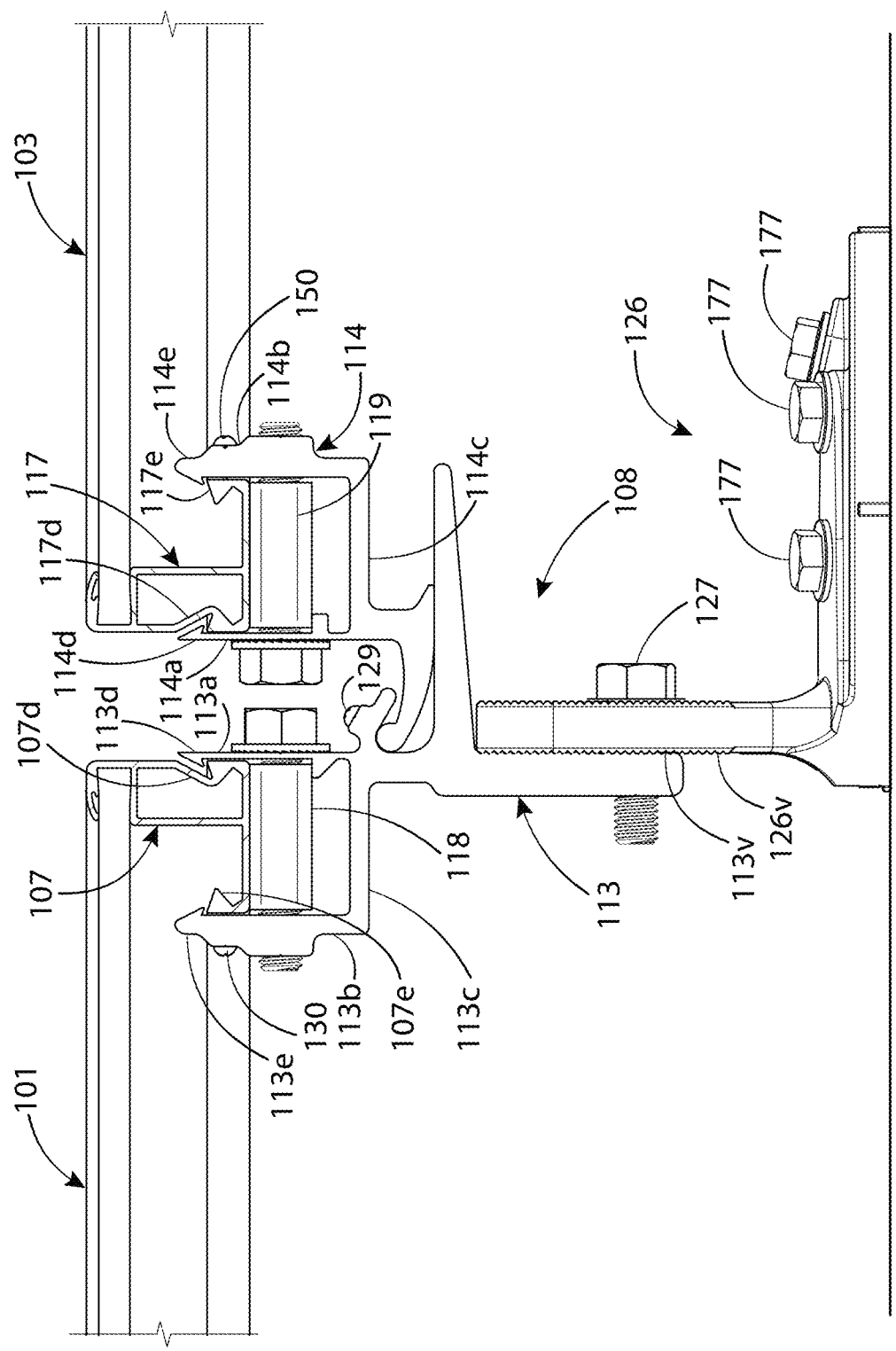
FIGS. 5, 6, and 7 illustrate sections views of the solar module system taken along section 5-5, 6-6, and 7-7, respectively, in FIG. 3.
Figure 6:
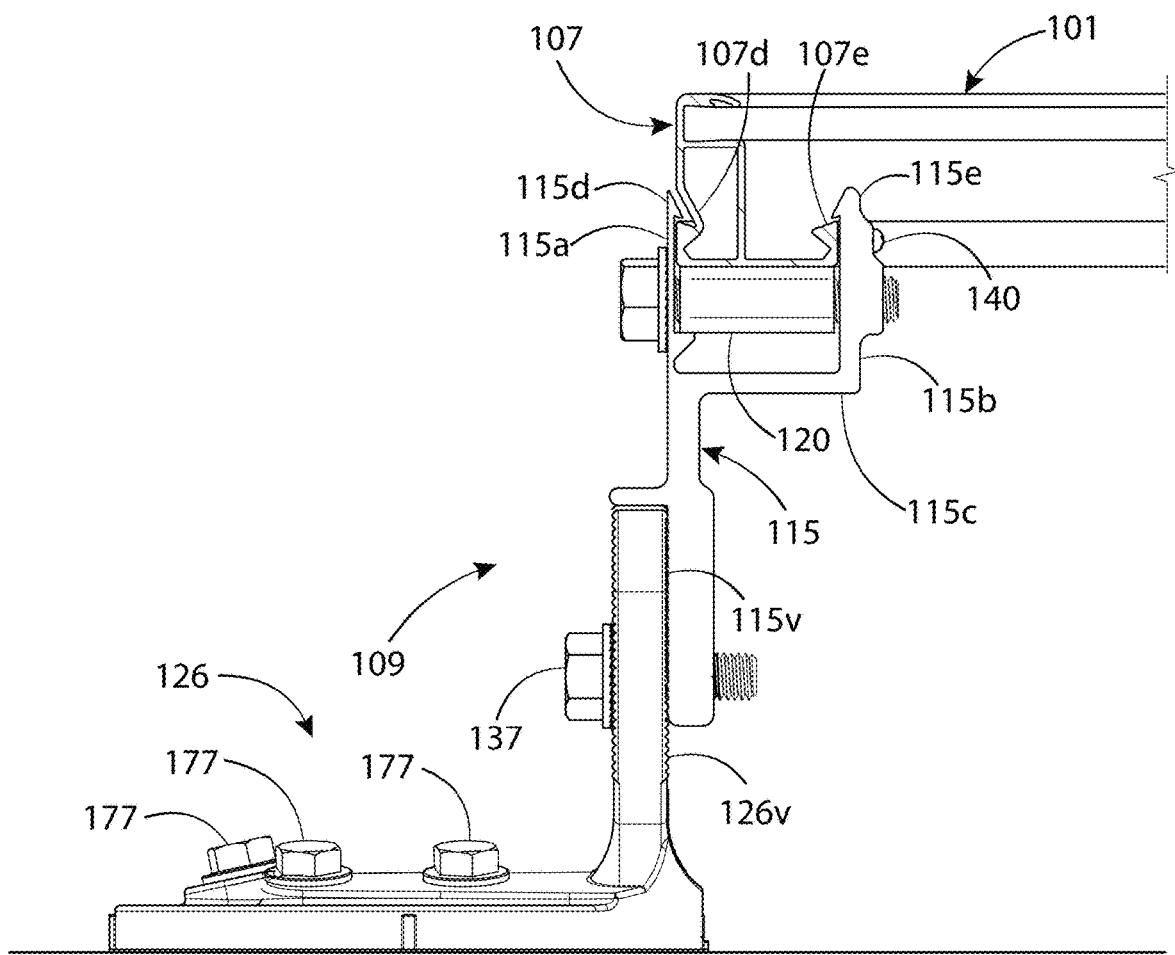
Figure 7:
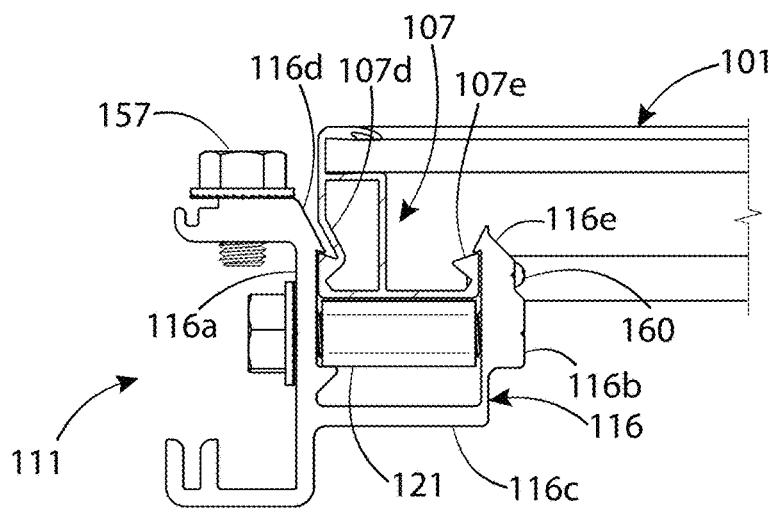

Integrating the solar module mounting system with solar module frames as described above, simplifies the structure of mounting components. For example, the mounting components share structure that allows them to snap into the first detent 107d and the second detent 107e in the solar module frame 107 without the use of tools as illustrated in FIGS. 5, 6, and 7. The bracket body 113 and the clamp body 114 of FIG. 5, bracket body 115 of FIG. 6, and skirt clamp body 116 of FIG. 7 each include a pair of arms extending upward from a base. Each arm includes a hook that is structured to capture and hold the detents in the solar module frame by spring tension.

For example, in FIG. 5, the bracket body 113 of the module-roof attachment assembly 108 includes a first bracket body arm 113a and a second bracket body arm 113b extending upward from a bracket body base 113c. The first bracket body arm 113a includes a first hook 113d and the second bracket body arm 113b includes a second hook 113e each facing the bracket body base 113c. The first hook 113d and the second hook 113e snap into the first detent 107d and the second detent 107e, respectively, of solar module frame 107.

The clamp body 114 of the module hook clamp 110 in FIG. 5 includes a first clamp arm 114a and a second clamp arm 114b extending upward from a clamp body base 114c. The first clamp arm 114a includes a first hook 114d and the second clamp arm includes a second hook 114e. The first hook 114d and the second hook 114e snap into the first detent 117d and the second detent 117e, respectively, of solar module frame 117 of solar module 103.

Referring to FIG. 6, the bracket body 115 of the module-roof attachment assembly 109 includes a first bracket body arm 115a and a second bracket body arm 115b extending upward from a bracket body base 115c. The first bracket body arm 115a includes a first hook 115d and the second bracket body arm 115b includes a second hook 115e each facing the bracket body base 115c. The first hook 115d and the second hook 115e snap into the first detent 107d and the second detent 107e, respectively, of the solar module frame 107 by spring tension.

Referring to FIG. 7, the skirt clamp body 116 of the skirt clamp 111 includes a first clamp arm 116a and a second clamp arm 116b extending upward from a skirt body base 116c. The first clamp arm 116a includes a first hook 116d, and the second clamp arm 116b includes a second hook 116e, each facing the skirt body base 116c. The first hook 116d and the second hook 116e snap into the first detent 107d and the second detent 107e, respectively, of the solar module frame 107.

Figure 8:
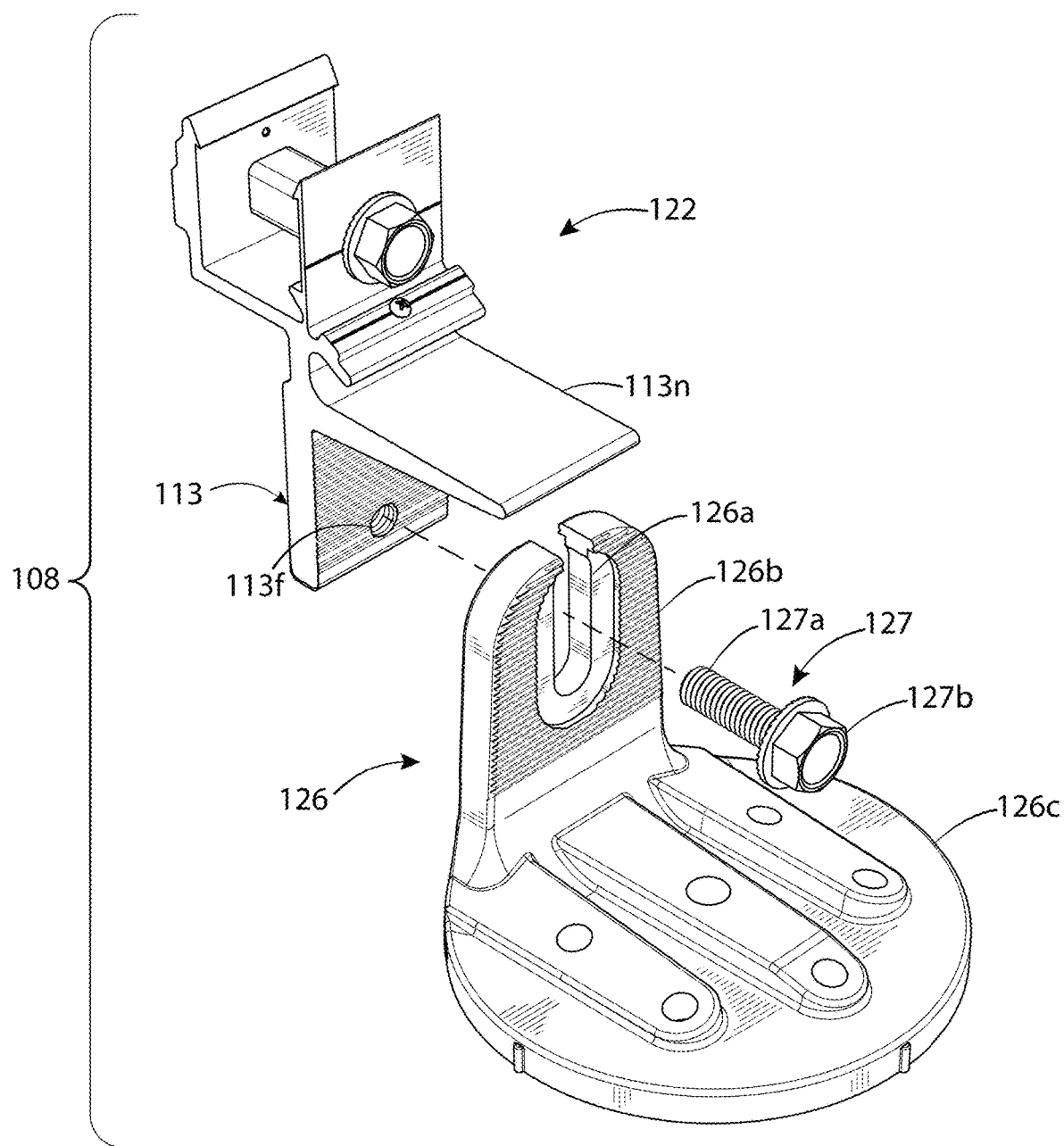
FIG. 8 illustrates, in perspective view, a universal-type module-roof attachment assembly, exploded away from the roof attachment bracket.
Figure 31:
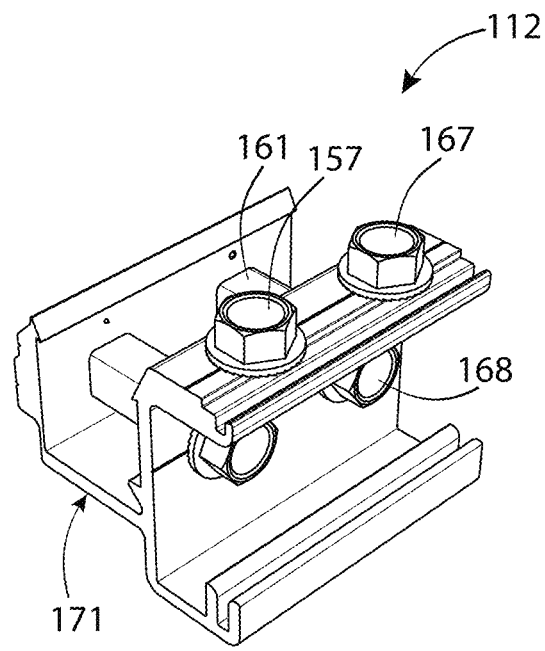
FIGS. 31 and 32 illustrate in front and rear perspective view, respectively, a skirt splice.
Figure 32:
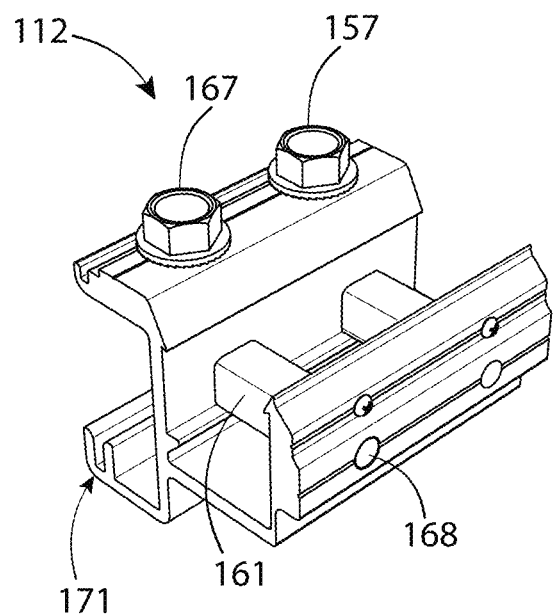

Referring to FIGS. 5-7, the return flange of the solar module frame can be optionally seated against a removably positionable spacer. The spacer is positioned so that it seats against the return flange of the solar module, while the first hook and the second hook secure the solar module. For example, FIG. 5 illustrates spacer 118 and spacer 119, FIG. 6 illustrates spacer 120, and FIG. 7 illustrates spacer 121. Components FIGS. 8-32 illustrate in more detail, the various components discussed for FIGS. 2 and 3. FIG. 8 illustrates the module-roof attachment assembly 108 with FIGS. 9-13 illustrating the module attachment bracket 122 of the module-roof attachment assembly 108 of FIG. 8. FIG. 14 illustrates the module-roof attachment assembly 109 with FIGS. 15-19 illustrating the module attachment bracket 123 of the module-roof attachment assembly 109. FIGS. 20-24 illustrate the module hook clamp 110. FIGS. 25-30 illustrate the skirt clamp 111 with FIGS. 25-27 also illustrating a portion of the skirt 125. FIGS. 31 and 32 illustrate the skirt splice 112.

Referring to FIG. 8, the module-roof attachment assembly 108, as illustrated, includes the module attachment bracket 122, and a roof attachment bracket 126. The module attachment bracket 122 can be used as a mid-clamp or universal clamp, because it can be positioned between solar modules or on the outside edges (i.e., the leading or trailing edges) of the solar module assembly. A threaded fastener 127, which is part of the module attachment bracket 122, secures the bracket body 113 of the module attachment bracket 122 to the roof attachment bracket 126. The fastener body 127a passes through a slot-shaped opening 126a in a bracket riser 126b where it engages a threaded aperture 113f. The fastener head 127b rests against the slot-shaped opening 126a. The roof attachment bracket 126 is illustrated as an L-foot. The bracket riser 126b extends upward from a bracket base 126c. The bracket base 126c is structured to attach to a roof surface. For example, the bracket base 126c may include various apertures for attaching deck screws, lag bolts, or other roof fasteners. The bottom surface of the bracket base 126c may include a recess and an elastomeric or butyl gasket positioned in the recess to facilitate water tightness.

Figure 9:
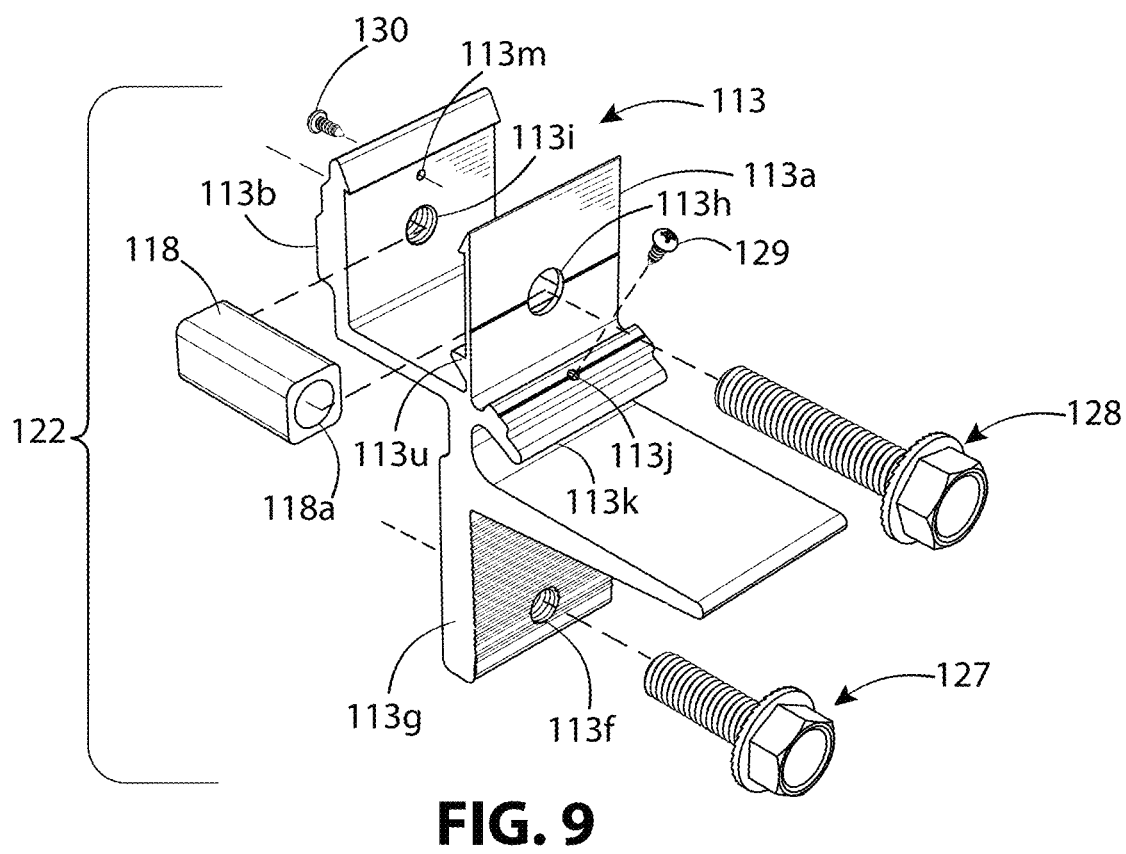
FIG. 9 illustrates the module attachment bracket of FIG. 8 in exploded perspective view.
Figure 10:
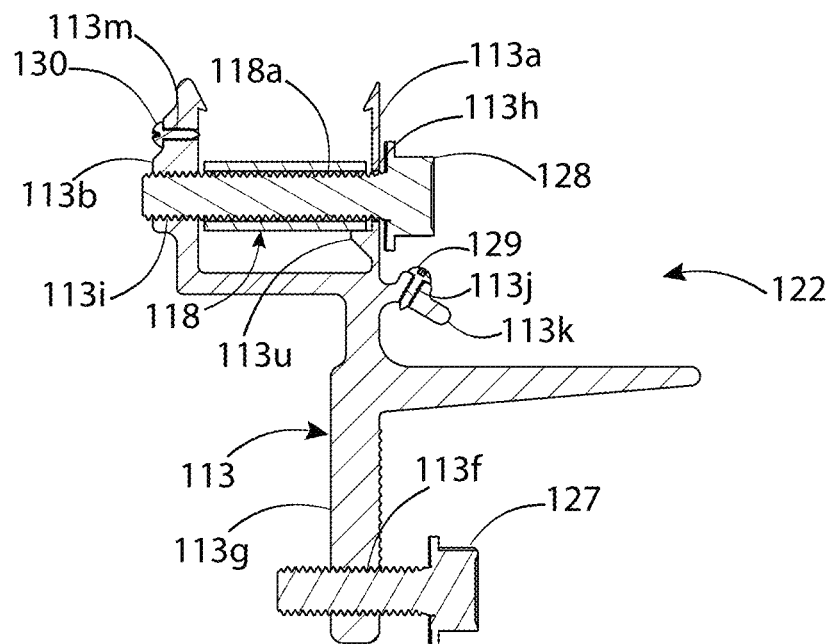
FIG. 10 illustrates a section view of the module attachment bracket taken along section lines 10-10 in FIG. 11.
Figure 11:
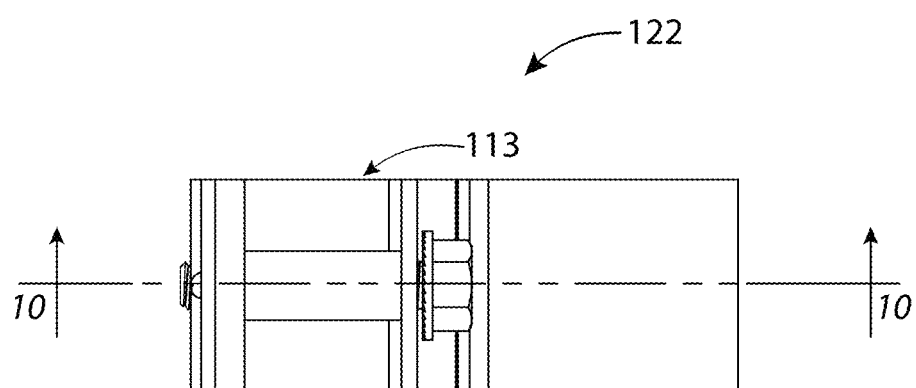
FIGS. 11-13 illustrate the module attachment bracket in top view, front perspective view, and rear perspective view, respectively.

Referring to FIG. 9-13, the module attachment bracket 122 includes a bracket body 113. Referring to FIGS. 9 and 10, the module attachment bracket 122 also may include threaded fastener 127, threaded fastener 128, bonding screw 129, bonding screw 130, and optionally, the removably positionable spacer, spacer 118. Threaded fastener 127 extends through and engages threaded aperture 113f in the riser 113g of the bracket body 113. Threaded fastener 128 extends through aperture 113h in the first bracket body arm 113a, through an aperture 118a that ends lengthwise through the spacer 118, and threadedly engages the threaded aperture 113i in the second bracket body arm 113b. Bonding screw 129, extends through an aperture 113j in the hook arm receiver 113k of the bracket body 113. Bonding screw 130 extends through an aperture 113m in the second bracket body arm 113b. Spacer stop 113u extends inward from the first bracket body arm 113a. Spacer stop 113u is positioned so that the bottom surface of the spacer 118 rests against it. The spacer stop 113u prevents rotation of the spacer 118 while turning threaded fastener 128. The spacer 118 is positioned so that the spacer 118 seats against the solar module (for example, the return flange of the solar module) while the first hook 113d and the second hook 113e secures the solar module.

Figure 12:
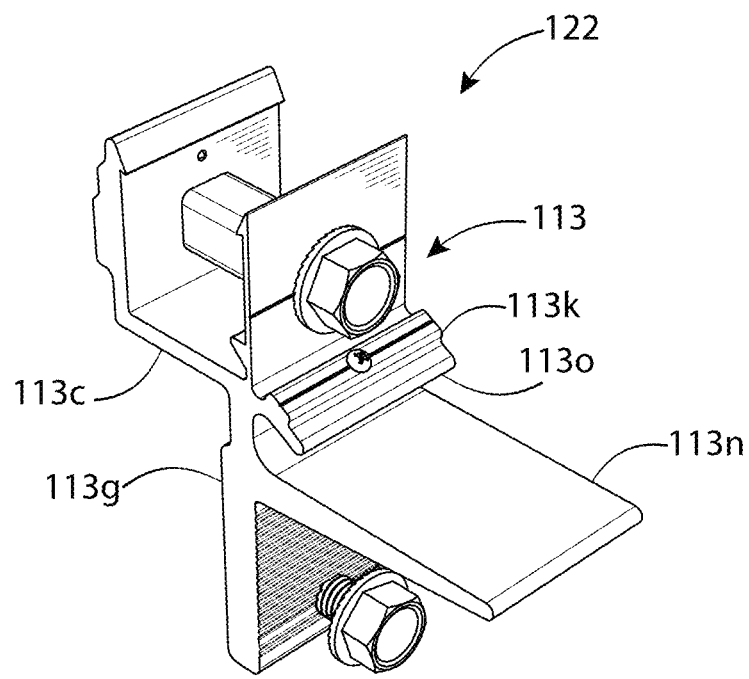
Figure 13:
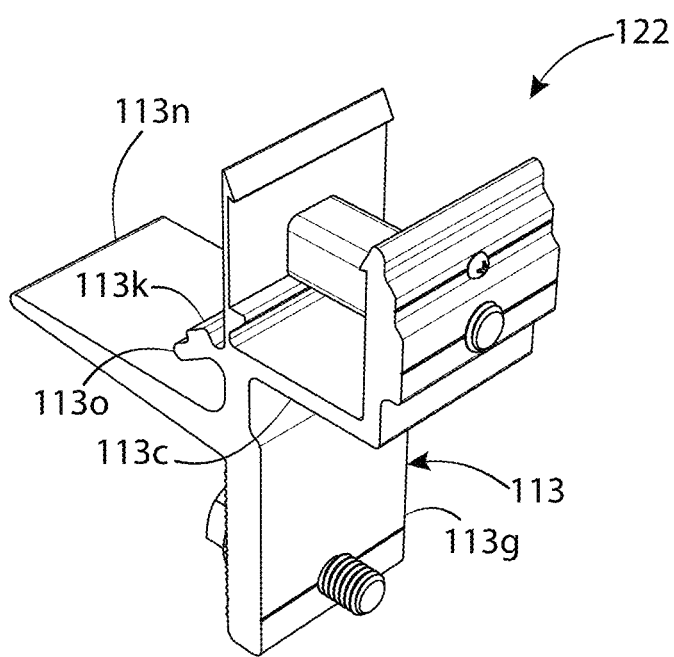
Figure 14:
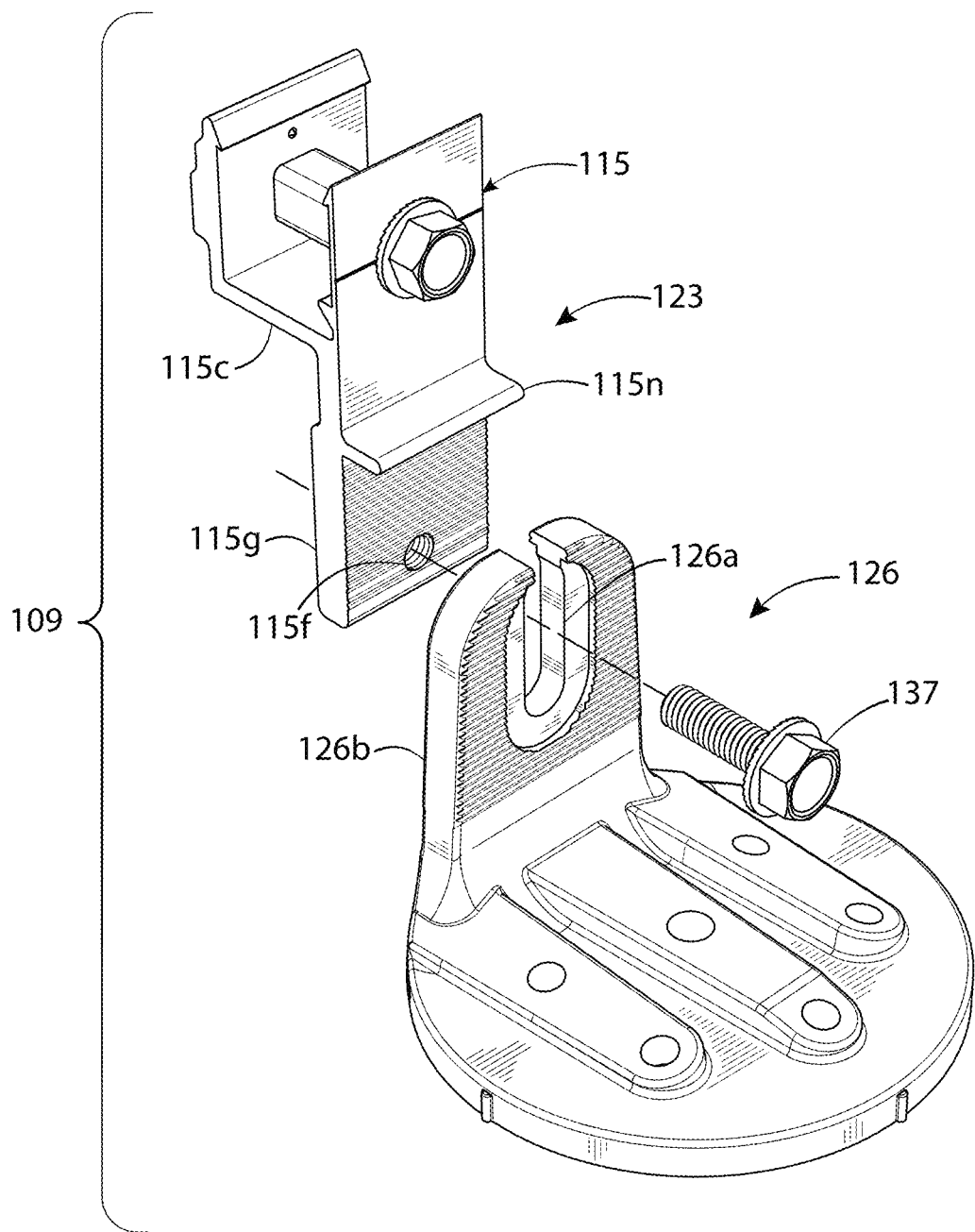
FIG. 14 illustrates, in perspective view, an end-clamp type module-roof attachment assembly, exploded away from the roof attachment bracket.

Referring to FIGS. 12 and 13, platform 113n extends away from the riser 113g on the opposite side of the riser 113g as the bracket body base 113c. The hook arm receiver 113k extends away from the riser 113g, with an end portion 113o of the hook arm receiver 113k extending toward the platform 113n. The platform 113n of FIGS. 12 and 13 is structured to seat the hook arm 114n of the clamp body 114 of the module hook clamp 110 of FIGS. 23 and 24. The hook arm receiver 113k in combination of the platform 113n of FIGS. 12 and 13, are together structured to rotationally receive and capture the open end 114k of the hook arm 114n of FIGS. 23 and 24. In FIGS. 12 and 13, the hook arm receiver 113k, for example, may include an arc-shaped, or concave shaped interior. Alternatively, it may include linear portions with arc-shaped, or concave shaped corners. The hook arm receiver 113k may include end portion 113o that extends downward toward the platform 113n to help retain the open end 114k of the hook arm of FIGS. 23 and 24. The open end 114k can be a ball hook catch to help facilitate rotation and remain captured in the hook arm receiver 113k, once positioned.

Referring to FIG. 14, the module-roof attachment assembly 109, as illustrated, includes the module attachment bracket 123, and a roof attachment bracket 136. The module attachment bracket 123 can be used as an end-clamp because it can be positioned on the outside edges (i.e., the leading or trailing edges) of the solar module assembly. A threaded fastener 137, which is part of the module attachment bracket 123, secures the bracket body 115 of the module attachment bracket 123 to the roof attachment bracket 136 in the same manner as described for module-roof attachment assembly 108 of FIG. 8. In FIG. 14, the threaded fastener 137 passes through a slot-shaped opening 136a in a bracket riser 136b where it engages a threaded aperture 115f in the riser 115g.

Figure 15:
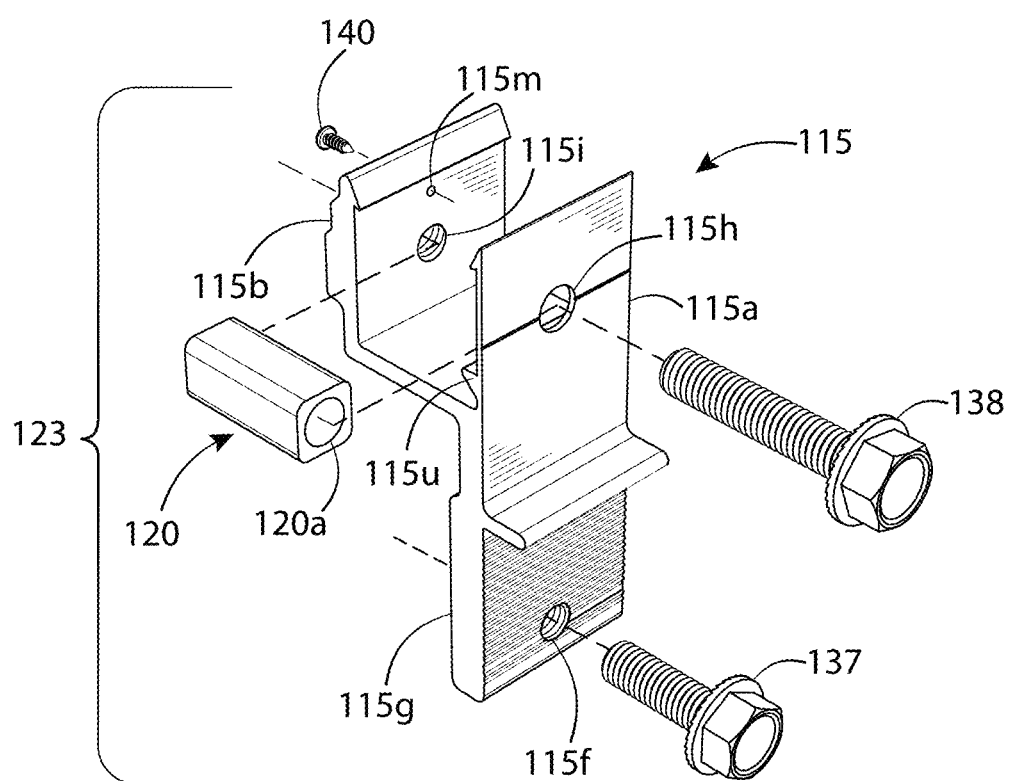
FIG. 15 illustrates the module attachment bracket of FIG. 14 in exploded perspective view.
Figure 16:
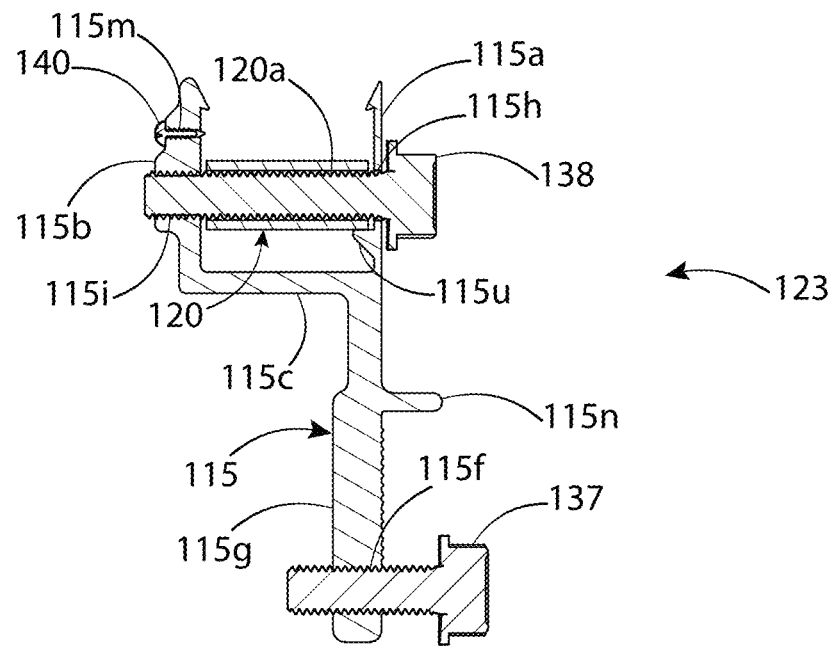
FIG. 16 illustrates a section view of the module attachment bracket taken along section lines 16-16 in FIG. 17.
Figure 17:
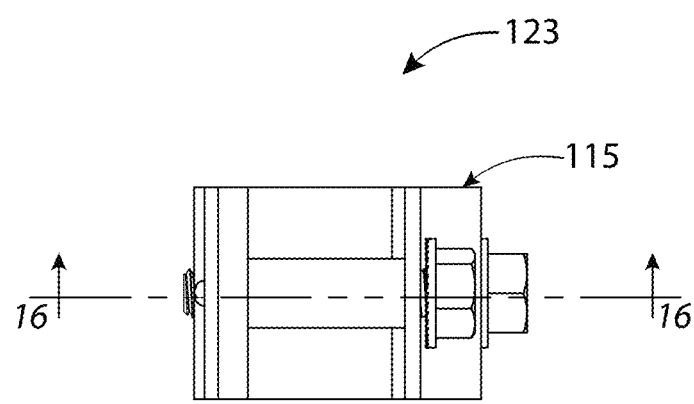
FIGS. 17-19 illustrate the module attachment bracket in top view, front perspective view, and rear perspective view, respectively.

Referring to FIG. 15-19, the module attachment bracket 123 includes a bracket body 115. Referring to FIGS. 15 and 16, the module attachment bracket 123 also may include threaded fastener 137, threaded fastener 138, bonding screw 140, and optionally, the spacer 120. Threaded fastener 137 extends through and engages threaded aperture 115f in the riser 115g of the bracket body 115. Threaded fastener 138 extends through aperture 115*h* in the first bracket body arm 115*a*, through an aperture 120*a* that ends lengthwise through the spacer 120, and threadedly engages the threaded aperture 115*i* in the second bracket body arm 115*b*. Bonding screw 140 extends through an aperture 115*m* in the second bracket body arm 115*b*. Spacer stop 115*u* extends inward from the first bracket body arm 115*a*. Spacer stop 115*u* is positioned so that the bottom surface of the spacer 118 rests against it. The spacer stop 115*u* prevents rotation of the spacer while turning threaded fastener 138.

Referring to FIGS. 14 and 16, bracket stop 115*n* extends away from the riser 115*g* on the opposite side of the riser 115*g* as the bracket body base 115*c*, i.e., the bracket stop 115*n* extends away from the bracket body base 115*c*. Referring to FIG. 14, the bracket stop 115*n* is structured and positioned to create a stop or reference position for the bracket riser 136*b*.

Figure 18:
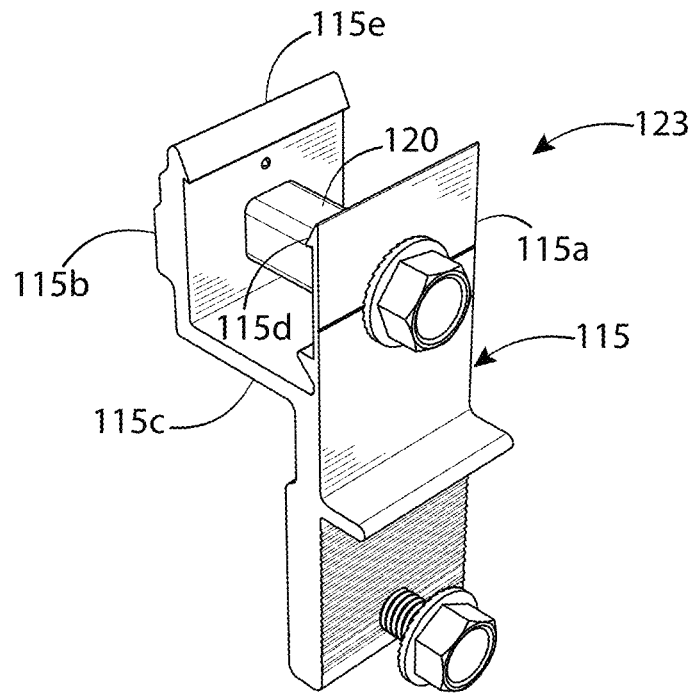
Figure 19:
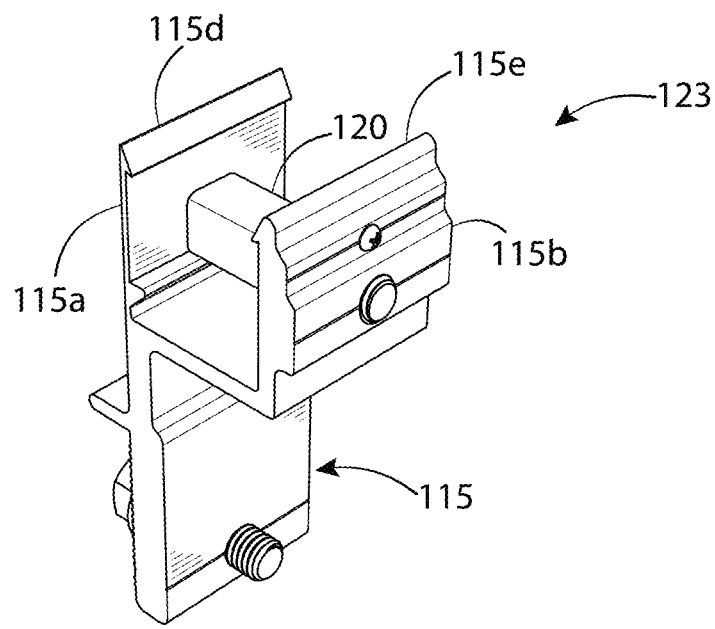

FIGS. 18 and 19 also illustrate, in perspective view the relationship between the first bracket body arm 115*a*, the second bracket body arm 115*b*, the bracket body base 115*c*, the first hook 115*d*, the second hook 115*e*, and the spacer 120. The spacer 120 is removably positionable between the first bracket body arm 115*a* and the second bracket body arm 115*b*. The spacer 120 is positioned so that the spacer 120 seats against the solar module (for example, the return flange of the solar module) while the first hook 115*d* and the second hook 115*e* secures the solar module.

Figure 20:
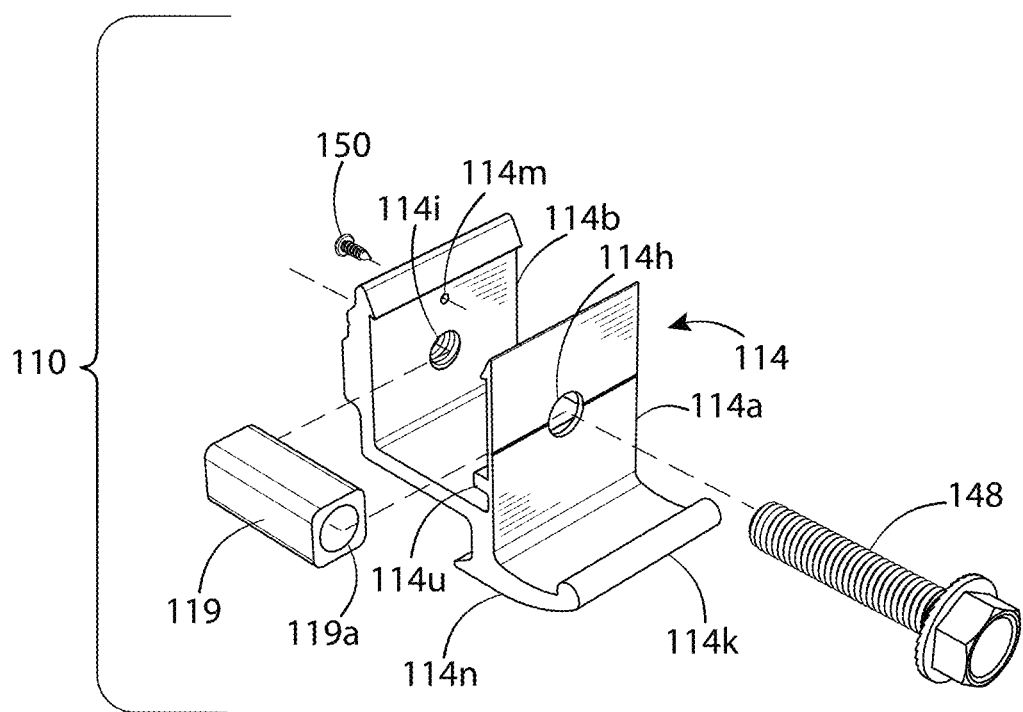
FIG. 20 illustrates the module hook clamp in exploded perspective view.
Figure 21:
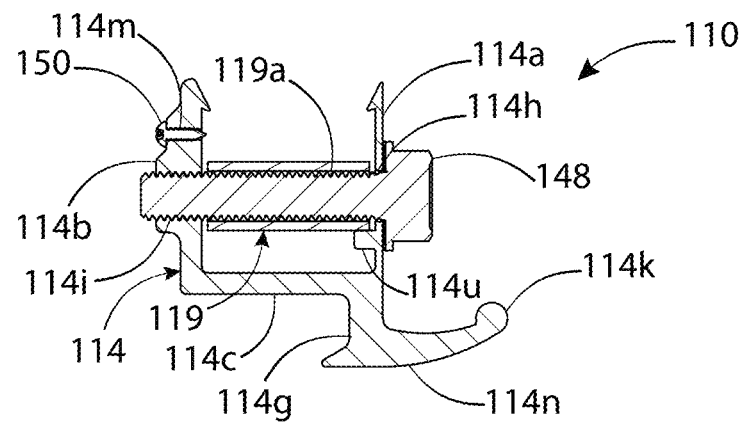
FIG. 21 illustrates a section view of the module hook clamp taken along section lines 21-21 in FIG. 22.
Figure 22:
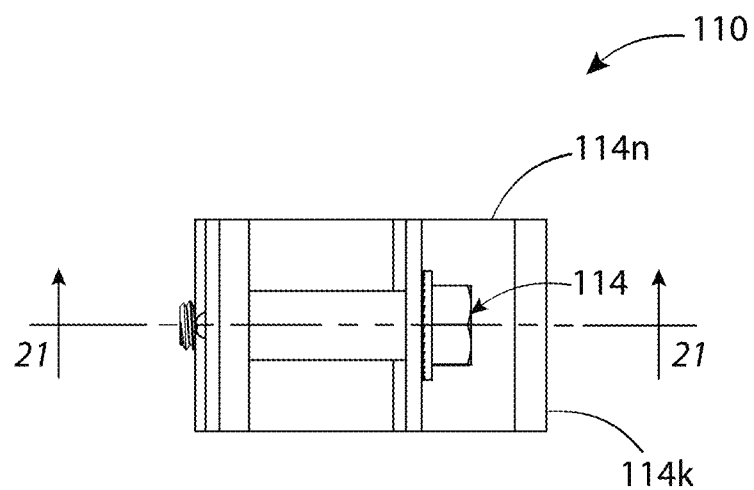
FIGS. 22-24 illustrate the module hook clamp in top view, front perspective view, and rear perspective view, respectively.
Figure 23:
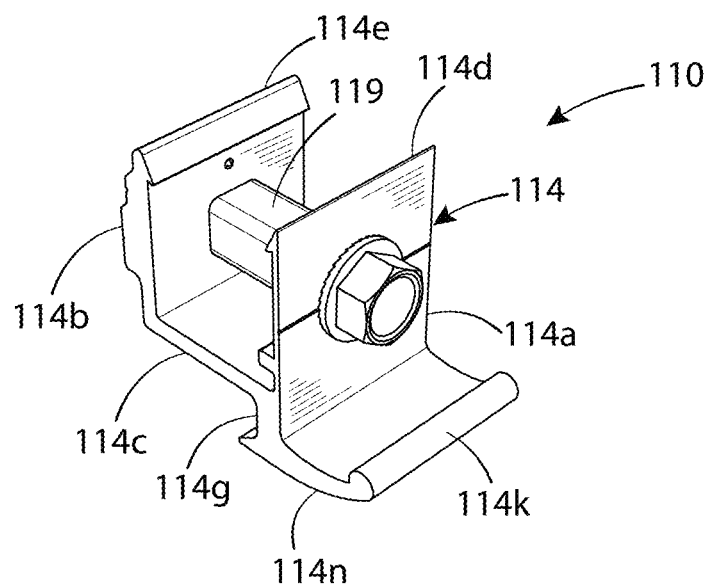
Figure 24:
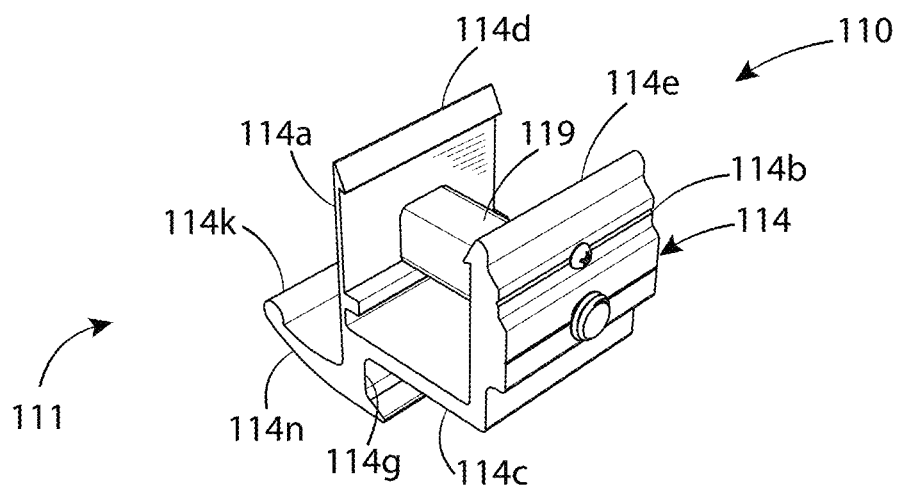

The module hook bracket of FIGS. 20-24 allows installers to quickly add rows of solar module assemblies. New solar module assemblies with leading-edge mounted instances of module hook clamp 110 (FIGS. 20-24) can secure to trailing-edge instances of module attachment bracket 122 (FIG. 12) of a previous row of solar module assemblies. Referring to FIGS. 20-24, the module hook clamp 110 includes a hook arm 114*n* with an open end 114*k*. The hook arm 114*n* is pivotable against the platform 113*n* of FIG. 12. The open end 114*k* engages the hook arm receiver 113*k* of FIG. 12. As illustrated, in FIGS. 20-24, the shape of the open end can be a ball hook catch to help facilitate pivoting. Referring to FIG. 21, to help facilitate pivoting, the hook arm 114*n* may be a generally curved-shaped seating surface. The generally curved-shaped seating surface may be downward-facing generally convex shape to help facilitate pivoting. Referring to FIGS. 21, 23, and 24, the hook arm 114*n* extends away from below the clamp body base 114*c*. The clamp body 114 may also include a riser 114*g* extending between and spacing apart the clamp body base 114*c* and the hook arm 114*n*.

Referring to FIGS. 20 and 21, the module hook clamp 110 may also include threaded fastener 148, bonding screw 150, and optionally, the spacer 119. Threaded fastener 148 extends through aperture 114*h* in the first clamp arm 114*a*, through an aperture 119*a* that ends lengthwise through the spacer 119, and engages the threaded aperture 114*i* in the second clamp arm 114*b*. Bonding screw 150 extends through an aperture 114*m* in the second clamp arm 114*b*. Spacer stop 114*u* extends inward from the first clamp arm 114*a*. Spacer stop 114*u* is positioned so that the bottom surface of the spacer 119 rests against it. The spacer stop 114*u* prevents rotation of the spacer 119 while turning threaded fastener 148.

FIGS. 23 and 24 also illustrate, in perspective view, the relationship between the first clamp arm 114*a*, the second clamp arm 114*b*, the clamp body base 114*c*, the first hook 114*d*, the second hook 114*e*, and the spacer 119. As previously described, the spacer 119 is removably positionable between the first clamp arm 114*a* and the second clamp arm 114*b*, the spacer 119 is positioned so that the spacer 119 seats against the solar module (for example, the return flange of the solar module) while the first hook 114*d* and the second hook 114*e* secures the solar module.

Referring FIG. 1, the solar module system 100 may include trim to create an architectural or aesthetic appearance. In FIG. 1, this trim is in the form of a skirt 125 the surrounds the perimeter of the solar module system. Referring to FIG. 2, instances of skirt clamp 111 secure the skirt of FIG. 1 to the solar modules. Instances of the skirt splice 112 secure the ends of adjacent skirt sections to each other. FIGS. 25-30 illustrate the skirt clamp 111 in various views. FIGS. 31 and 32 illustrate the skirt splice 112.

Figure 25:
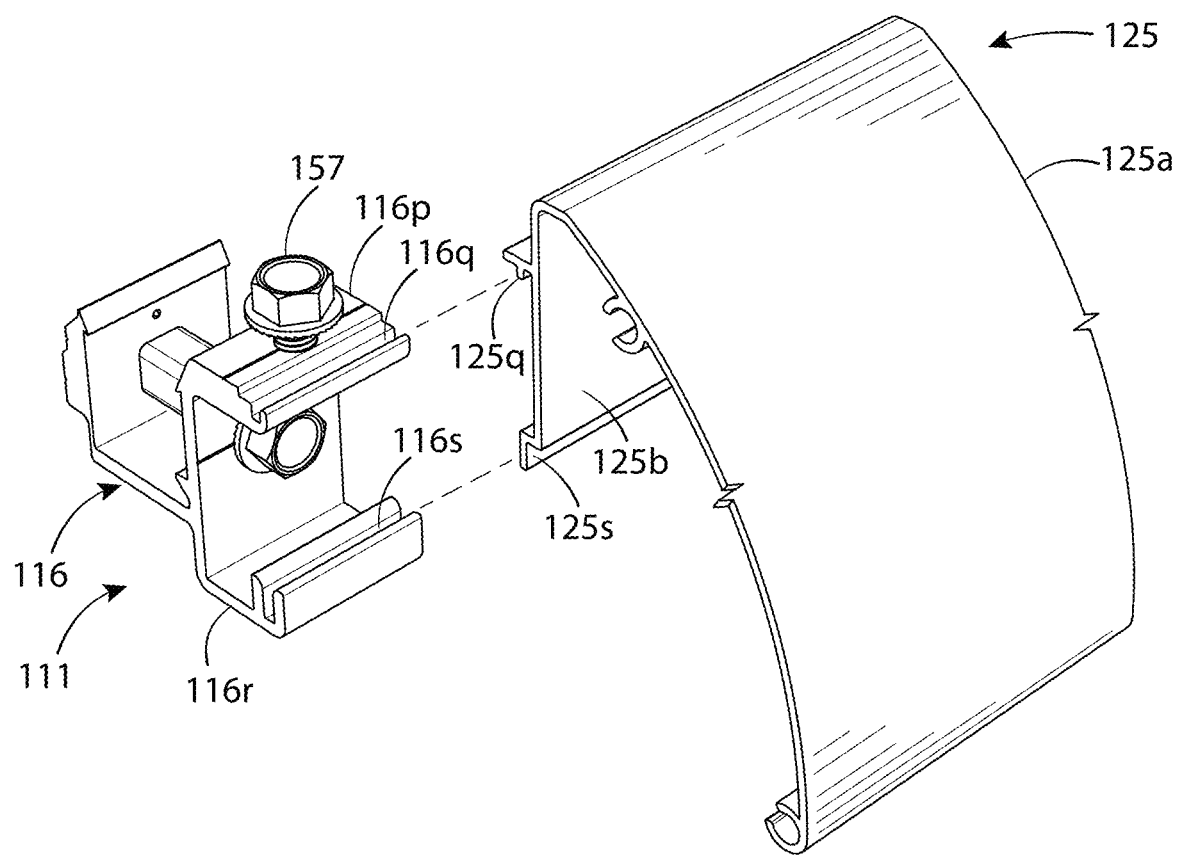
FIG. 25 illustrates, in perspective view, a portion of a skirt exploded away from a skirt clamp.
Figure 26:
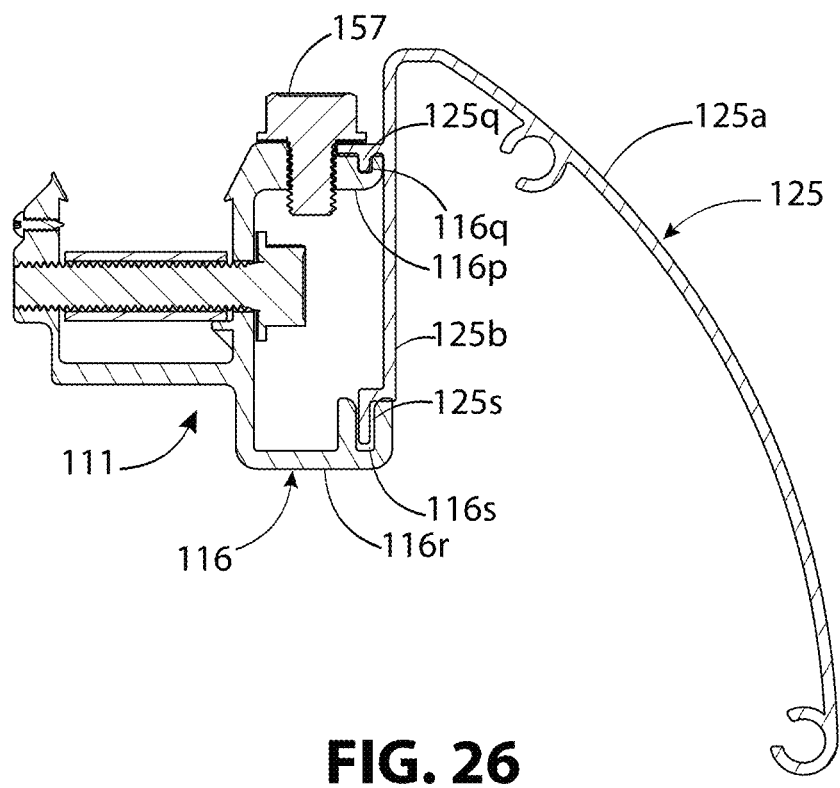
FIG. 26 illustrates a section view of the skirt clamp and portion of a skirt taken along section lines 26-26 in FIG. 27.
Figure 27:
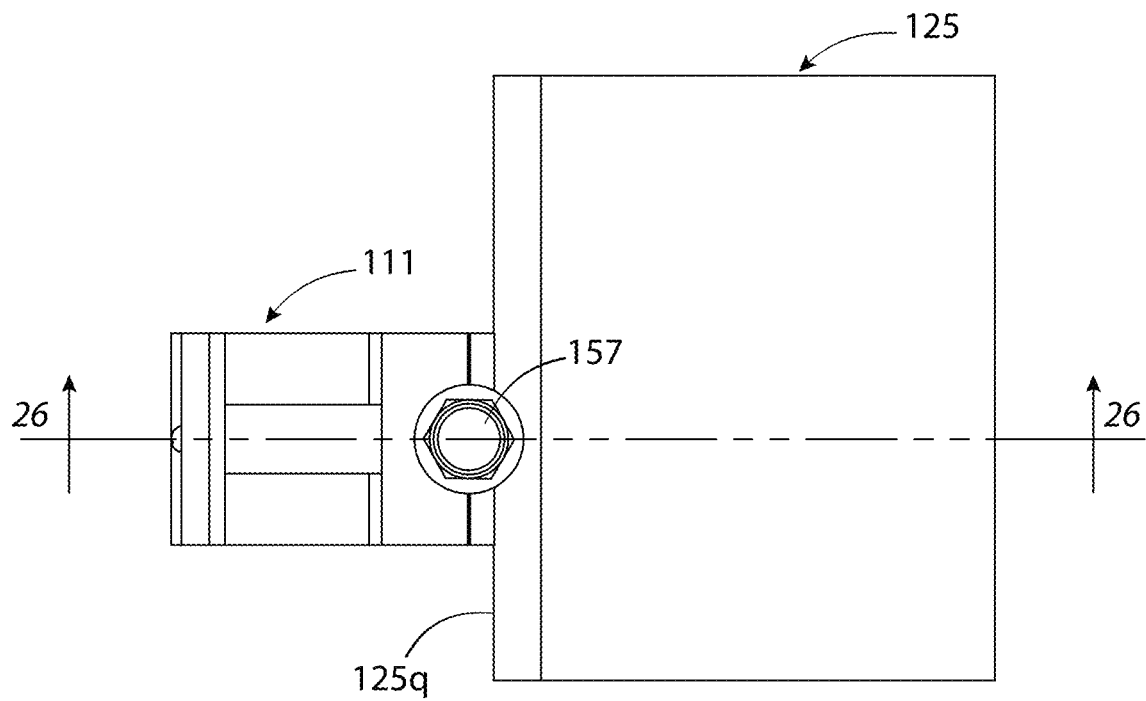
FIG. 27 illustrates a top view of the skirt clamp and portion of a skirt.

FIGS. 25-27 illustrate how the skirt clamp 111 secures the skirt 125, with these figures showing a portion of the skirt 125. In FIGS. 25 and 26, the skirt clamp 111 includes a skirt clamp body 116 with an upper arm 116*p*. The upper arm 116*p* includes an upper groove 116*q* extending the length of the upper arm 116*p*. The skirt clamp body 116 includes a lower arm 116*r* with a lower groove 116*s*. The lower groove 116*s* extends the length of the lower arm 116*r*. The skirt 125 includes an outer face 125*a* that faces outward away from skirt clamp 111. The skirt 125 also includes an inner face 125*b* that faces inward toward the skirt clamp 111. The inner face 125*b* includes an upper tongue 125*q* and a lower tongue 125*s*. Portions of the upper tongue 125*q* and the lower tongue 125*s* project downward. The upper tongue 125*q* and lower tongue 125*s* are positioned and structured to slide into the upper groove 116*q* and lower groove 116*s*, respectively. Referring to FIG. 25-27, threaded fastener 157 secures a portion of upper tongue 125*q* to the upper arm 116*p*. Referring to FIGS. 25 and 26, this also holds the lower tongue 125*s* in the lower groove 116*s*.

Figure 28:
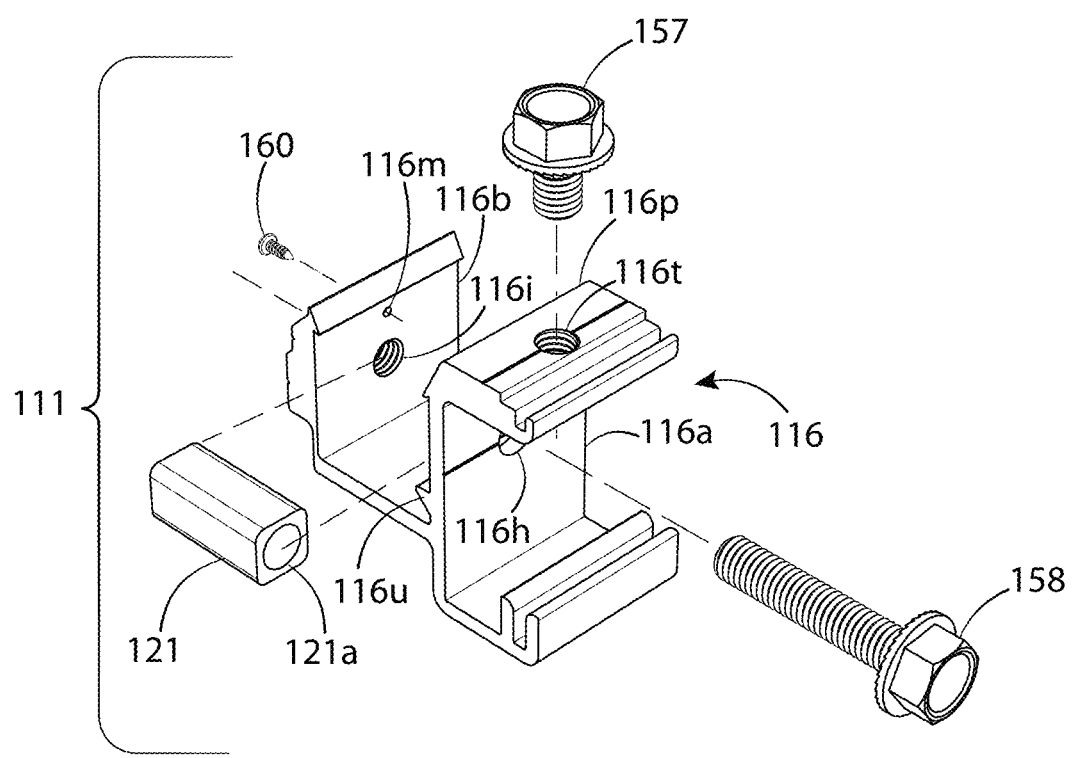
FIGS. 28-30 illustrate the skirt clamp in exploded perspective view, front perspective view, and rear perspective view, respectively.

Referring to FIG. 28, the threaded fastener 157 threadedly engages aperture 116*t* in the upper arm 116*p*. Threaded fastener 158 extends through aperture 116*h* in the first clamp arm 116*a*, through an aperture 121*a* that extends lengthwise through the spacer 121, and threadedly engages the threaded aperture 116*i* in the second clamp arm 116*b*. Bonding screw 160 extends through an aperture 116*m* in the second clamp arm 116*b*. Spacer stop 116*u* extends inward from the first clamp arm 116*a*. Spacer stop 116*u* is positioned so that the bottom surface of the spacer 121 rests against it. The spacer stop 116*u* prevents rotation of the spacer 121 while turning threaded fastener 158.

Figure 29:
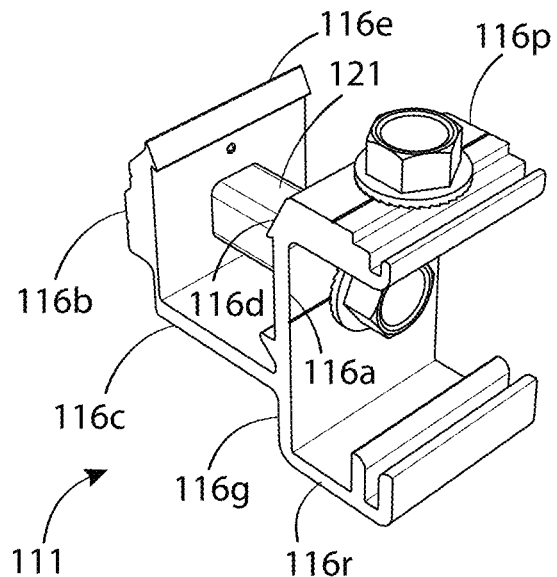
Figure 30:
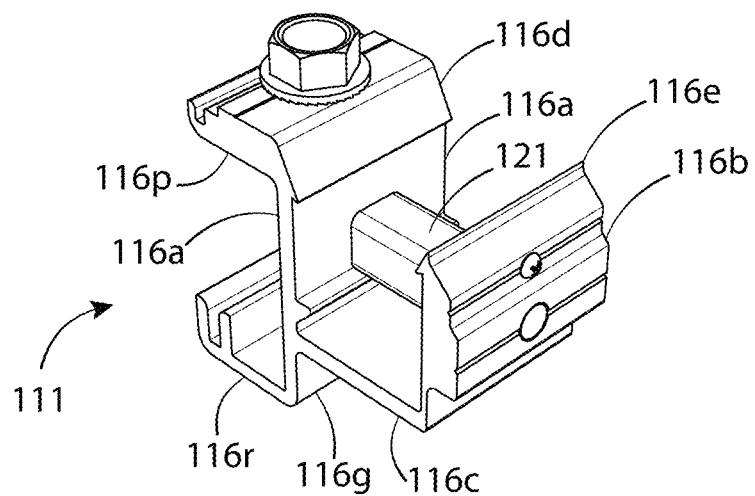

FIGS. 29 and 30 also illustrate, in perspective view the relationship between the first clamp arm 116*a*, the second clamp arm 116*b*, the skirt body base 116*c*, the first hook 116*d*, the second hook 116*e*, and the spacer 121. FIGS. 29 and 30 also illustrate the relationship between the upper arm 116*p*, the lower arm 116*r*, and the skirt body base 116*c*. The spacer 121 is removably positionable between the first clamp arm 116*a* and the second clamp arm 116*b*, the spacer 121 is positioned so that the spacer 121 seats against the solar module as previously discussed for other similar spacers. The upper arm 116*p* and the lower arm 116*r* are spaced apart by the first clamp arm 116*a* and the riser 116*g*. The riser 116*g* extends downward from the skirt body base 116*c* and the first clamp arm 116*a* extends upward from the skirt body base 116*c*.

FIGS. 31 and 32 illustrate front and rear perspective view of the skirt splice 112. The skirt splice 112 may be structurally similar to the skirt clamp 111 of FIGS. 25-30 with the following differences. The skirt splice 112 may be longer to allow attachment of two adjacent skirt sections. In addition to threaded fastener 157, the skirt splice 112 includes threaded fastener 167, each threaded fastener securing the end of an adjacent skirt section. Because of the additional length, the skirt splice 112 may optionally include an additional spacer, spacer 161, with an associated fastener, threaded fastener 168. Threaded fastener 168 and spacer 161 maintain the same relation with the skirt splice body 171 as described for threaded fastener 157, and spacer 121 of FIGS. 29 and 30.

Example Assembly Method

Figure 33:
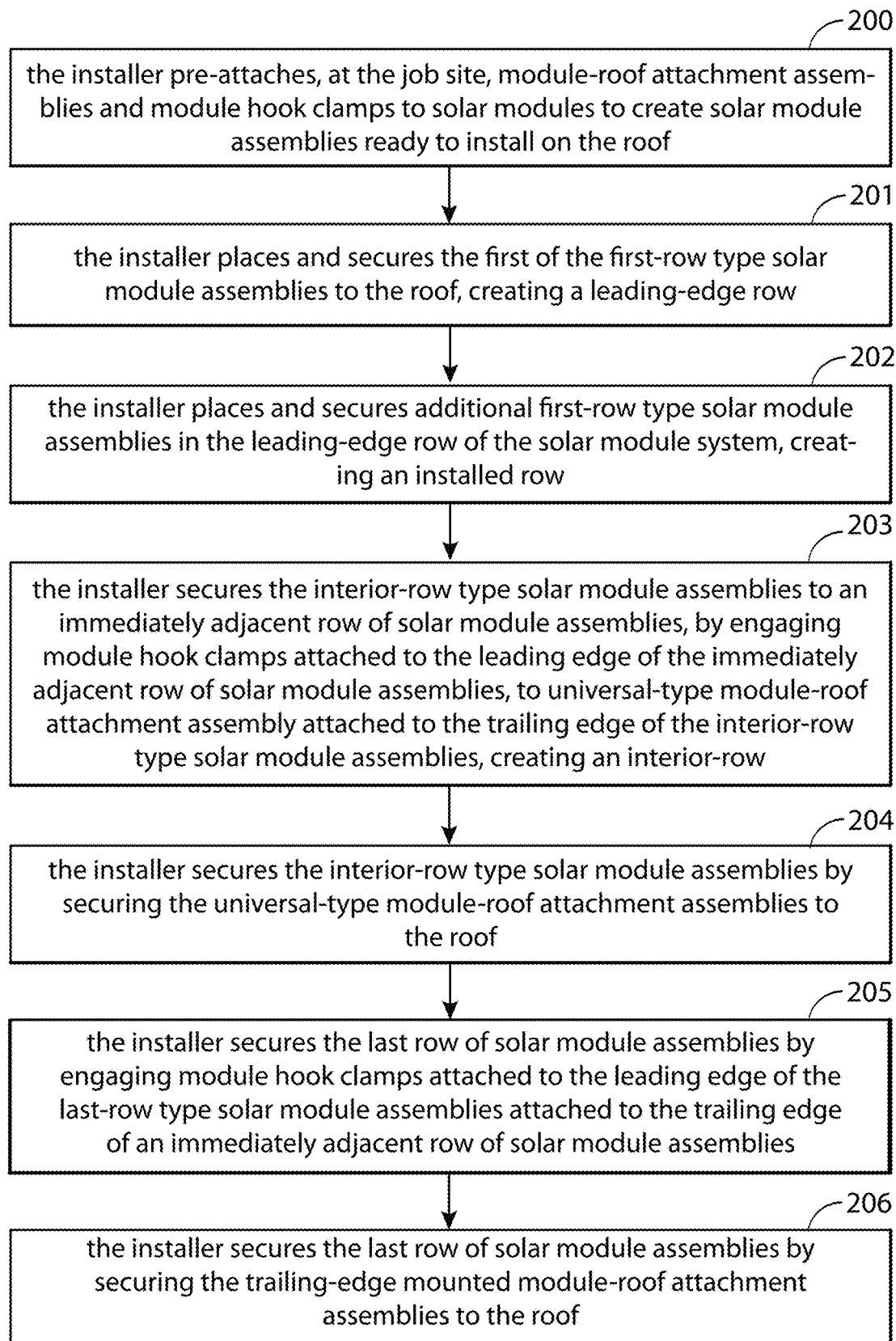
FIGS. 33 and 34 illustrate, via flow charts, an assembly sequence of the solar module system.
Figure 34:
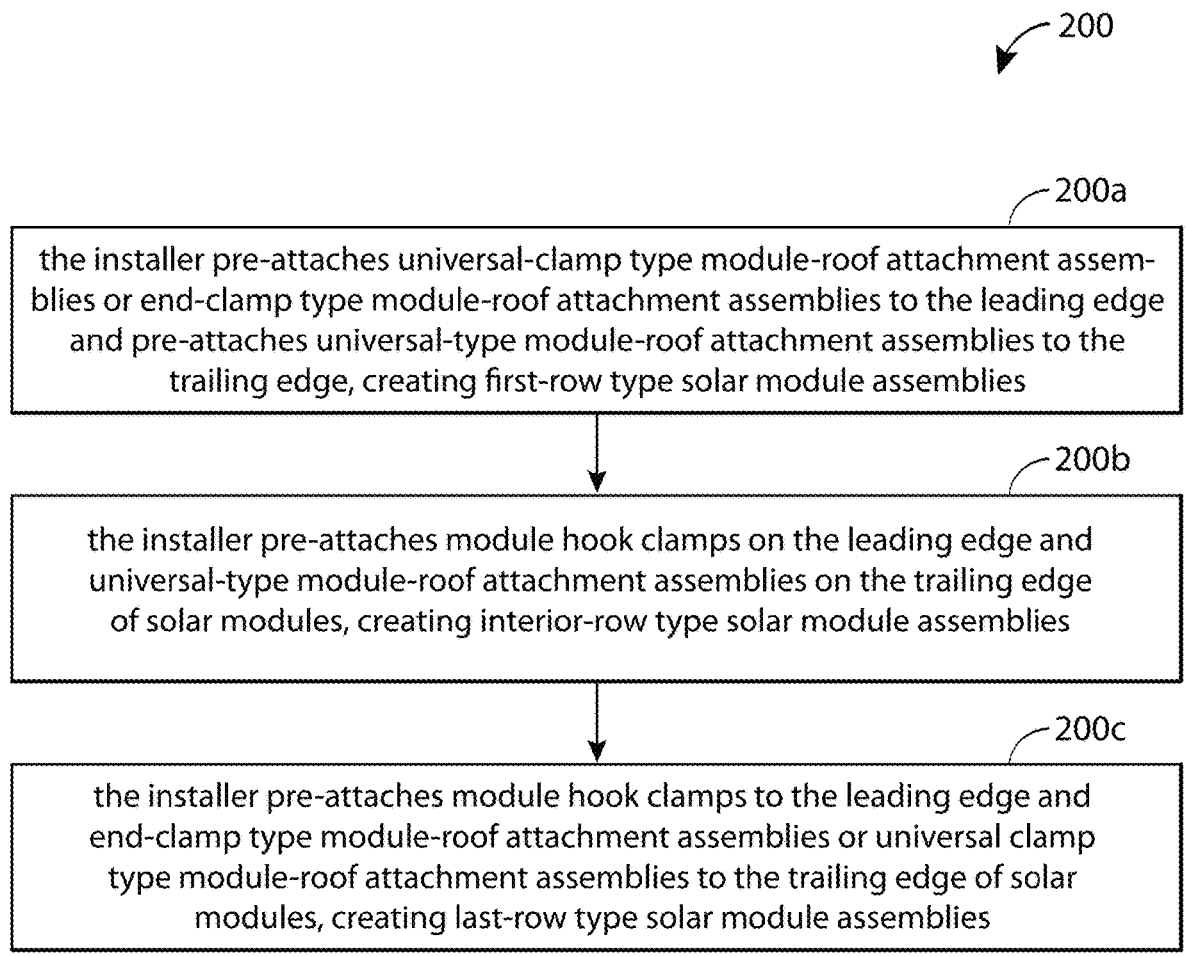

FIGS. 33-56 illustrate an example of an assembly method. FIG. 33 illustrates a flowchart that provides an overview of a typical assembly method. In step 200, the installer pre-attaches, at the job site, module-roof attachment assemblies and module hook clamps to solar modules to create solar module assemblies ready to install on the roof. Referring to FIG. 34, in step 200a, the installer pre-attaches universal-clamp type module-roof attachment assemblies (for example, FIG. 8) or end-clamp type module-roof attachment assemblies (for example, FIG. 14) to the leading edge and pre-attaches universal-type module-roof attachment assemblies to the trailing edge, creating first-row type solar module assemblies. In step 200b of FIG. 34, the installer pre-attaches module hook clamps on the leading edge and universal-type module-roof attachment assemblies on the trailing edge of solar modules, creating interior-row type solar module assemblies. In step 200c of FIG. 34, the installer pre-attaches module hook clamps to the leading edge and end-clamp type module-roof attachment assemblies or universal clamp type module-roof attachment assemblies to the trailing edge of solar modules, creating last-row type solar module assemblies.

An installer may pre-attach module-roof attachment assemblies and module hook clamps to the solar modules on the ground, a work surface, against building surfaces, such as a wall, or the job-site roof. For example, an installer may pre-install the module-roof attachment assemblies and module hook clamps to their respective solar modules with the solar module placed face down on the work surface or ground. The installer might lean the solar module against the side of the building and install the module-roof attachment assemblies and module hook clamps. In either case, the installer would then carry or lift, by hand, or by mechanical assistance, the resultant solar module assemblies to the roof. The installer might opt to pre-attach some or all of the module-roof attachment assemblies and module hook clamps to their respective solar modules on the roof. In this example, the installer would typically place the solar module face down on the roof during assembly.

Figure 35:
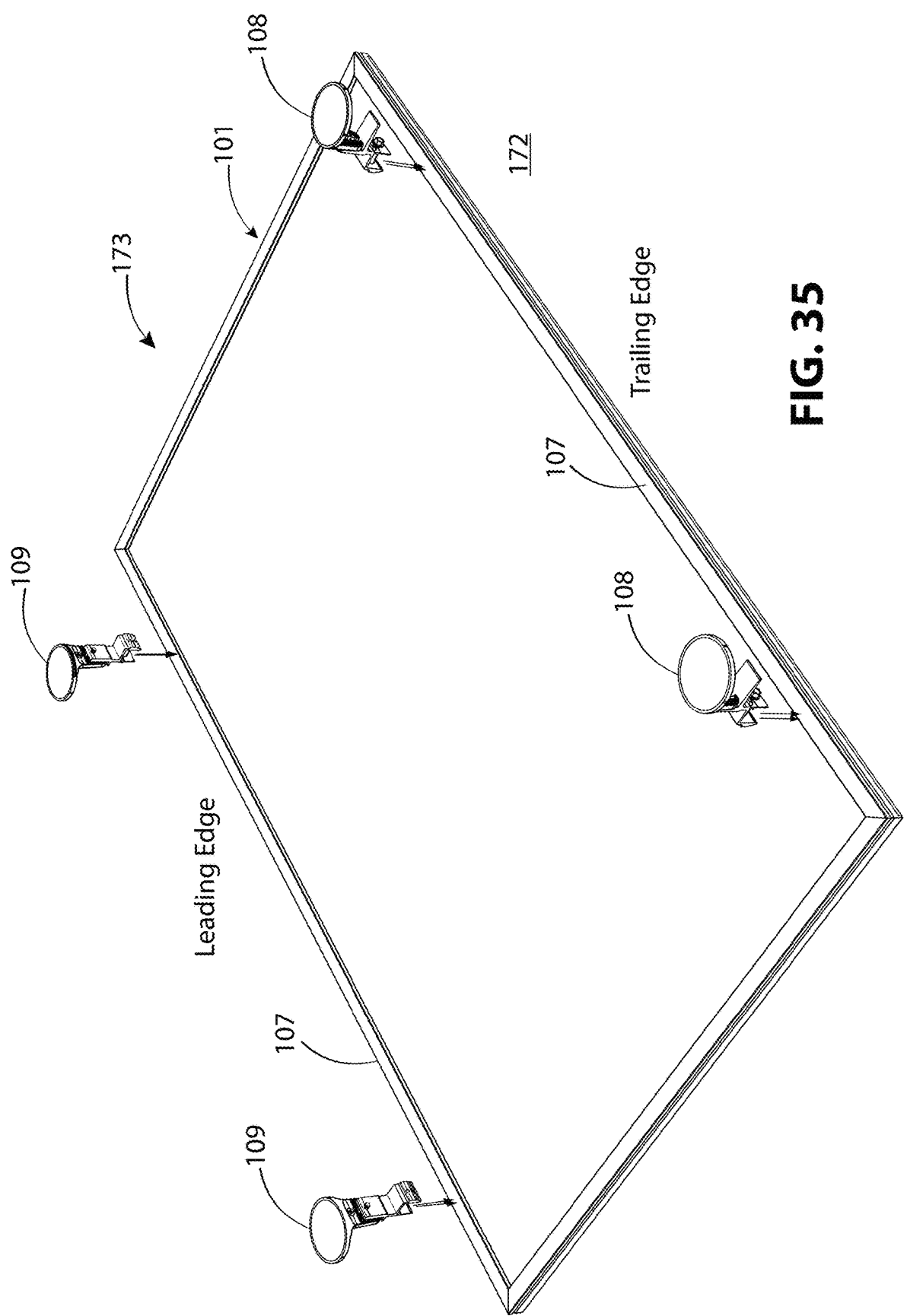
FIG. 35 illustrates, in perspective view, pre-attaching end-clamp type module-roof attachment assemblies and universal clamp type module-roof attachment assemblies to the leading edge and the trailing edge, respectively, of a solar module frame.
Figure 36:
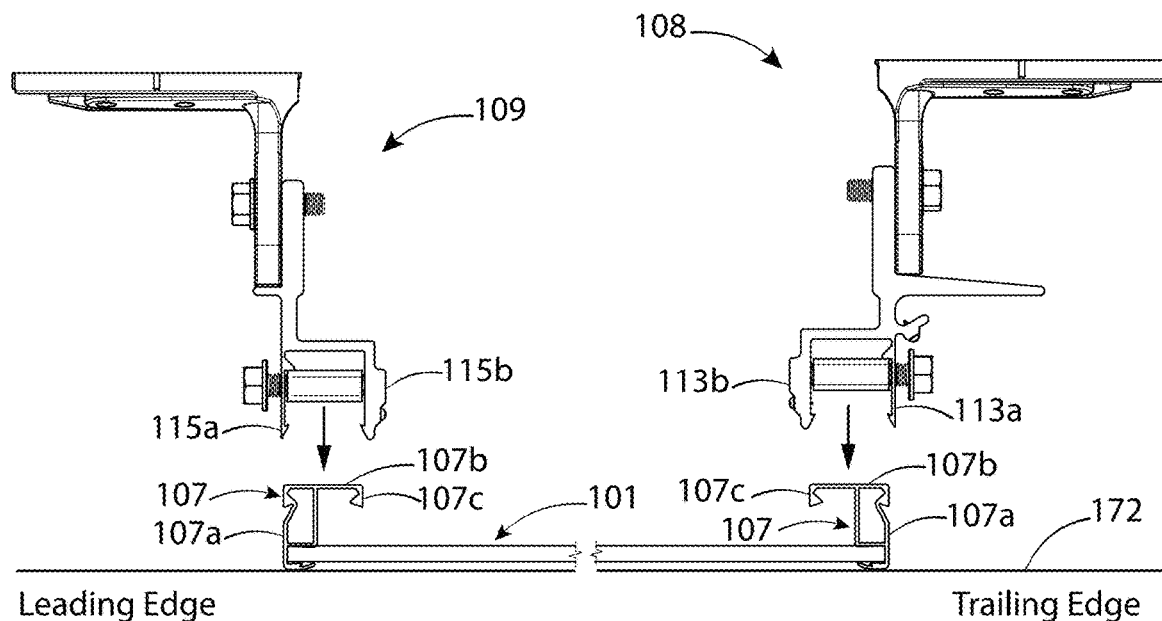
FIGS. 36 and 37 illustrate, in side view, a sequence of pre-attaching module-roof attachment assemblies to the solar module of FIG. 35.
Figure 37:
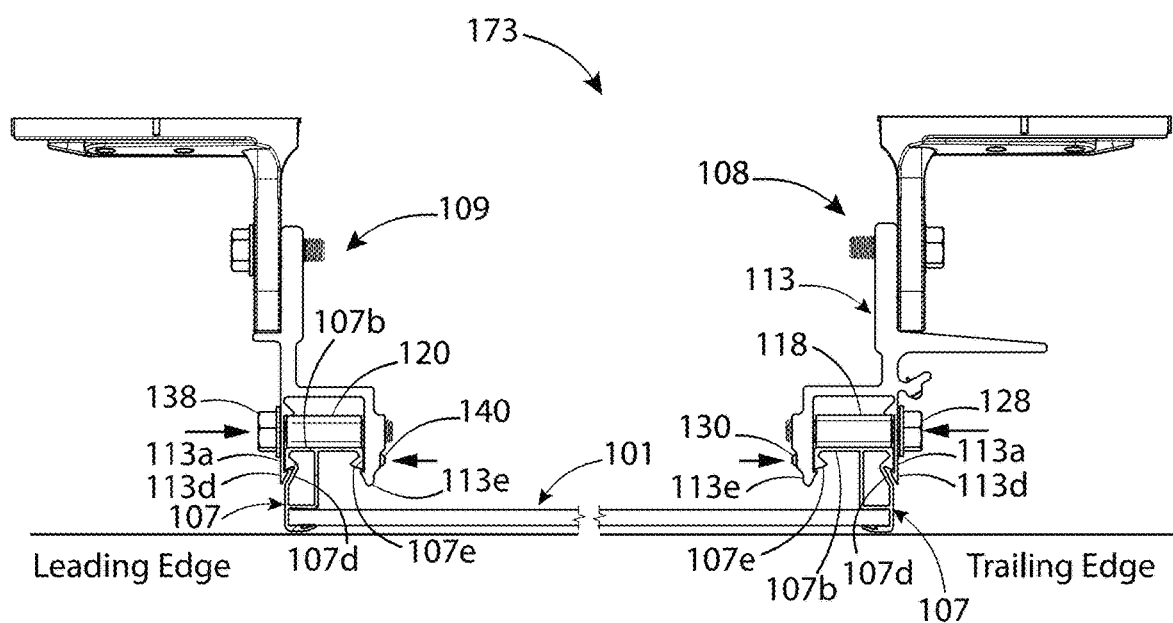

FIGS. 35-37 illustrate an example, of step 200a from FIG. 34. FIG. 35 illustrates the attachment process in perspective view, and FIGS. 36 and 37 illustrate the attachment process in side view with portions of the solar module cutaway for clarity. Referring to FIG. 35, the solar module 101 is placed face down on a work surface 172, such as a driveway, carport, workbench, or the surface of a roof. Instances of module-roof attachment assembly 108 attach to the solar module frame 107 at the trailing edge of solar module 101. Instances of module-roof attachment assembly 109 attach to the solar module frame 107 at the leading edge of solar module 101. Note that additional instances of module-roof attachment assembly 108 can be substituted for each instance of module-roof attachment assembly 109. The completed assembly results in solar module assembly 173.

Referring to FIG. 36, the installer aligns the first bracket body arm 113a and second bracket body arm 113b of the module-roof attachment assembly 108 over trailing-edge side of the return flange 107b. The installer then pushes the first bracket body arm 113a and second bracket body arm 113b over the outward-facing surface 107a and the return flange end, respectively, of the solar module frame 107. The return flange end, as illustrated, includes the upward-projected portion 107c. The first bracket body arm 113a splays outward while both bracket body arms are pushed over the solar module frame 107.

Referring to FIG. 37, with the first hook 113d and second hook 113e engaged within the first detent 107d and second detent 107e respectively, the first bracket body arm 113a springs back toward its resting position and the module-roof attachment assembly 108 is held to the solar module frame 107 by spring tension. The return flange 107b rests against the spacer 118. The installer may then tighten threaded fastener 128 to create additional clamping force on the first detent 107d and second detent 107e. The installer also may tighten bonding screw 130 to create an electrical bond between the bracket body 113 and the solar module frame 107.

Referring to FIG. 36, the installer aligns the first bracket body arm 115a and second bracket body arm 115b of the module-roof attachment assembly 109 over the leading-edge side of the return flange 107b. The installer pushes the first bracket body arm 115a and second bracket body arm 115b over the outward-facing surface 107a and the return flange end, respectively, of the solar module frame 107. The return flange end, as illustrated, includes the upward-projected portion 107c. The first bracket body arm 115a splays outward while both bracket body arms are pushed over the solar module frame 107. Referring to FIG. 37, with the first hook 115d and second hook 115e engaged within the first detent 107d and second detent 107e respectively, the first bracket body arm 115a springs back toward its resting position, and the module-roof attachment assembly 109 is held to the solar module frame 107 by spring tension. The return flange 107b rests against the spacer 120. The installer may then tighten threaded fastener 138 to create additional clamping force on the first detent 107d and second detent 107e. The installer also may tighten bonding screw 140 to create an electrical bond between the bracket body 115 and the solar module frame 107.

Figure 38:
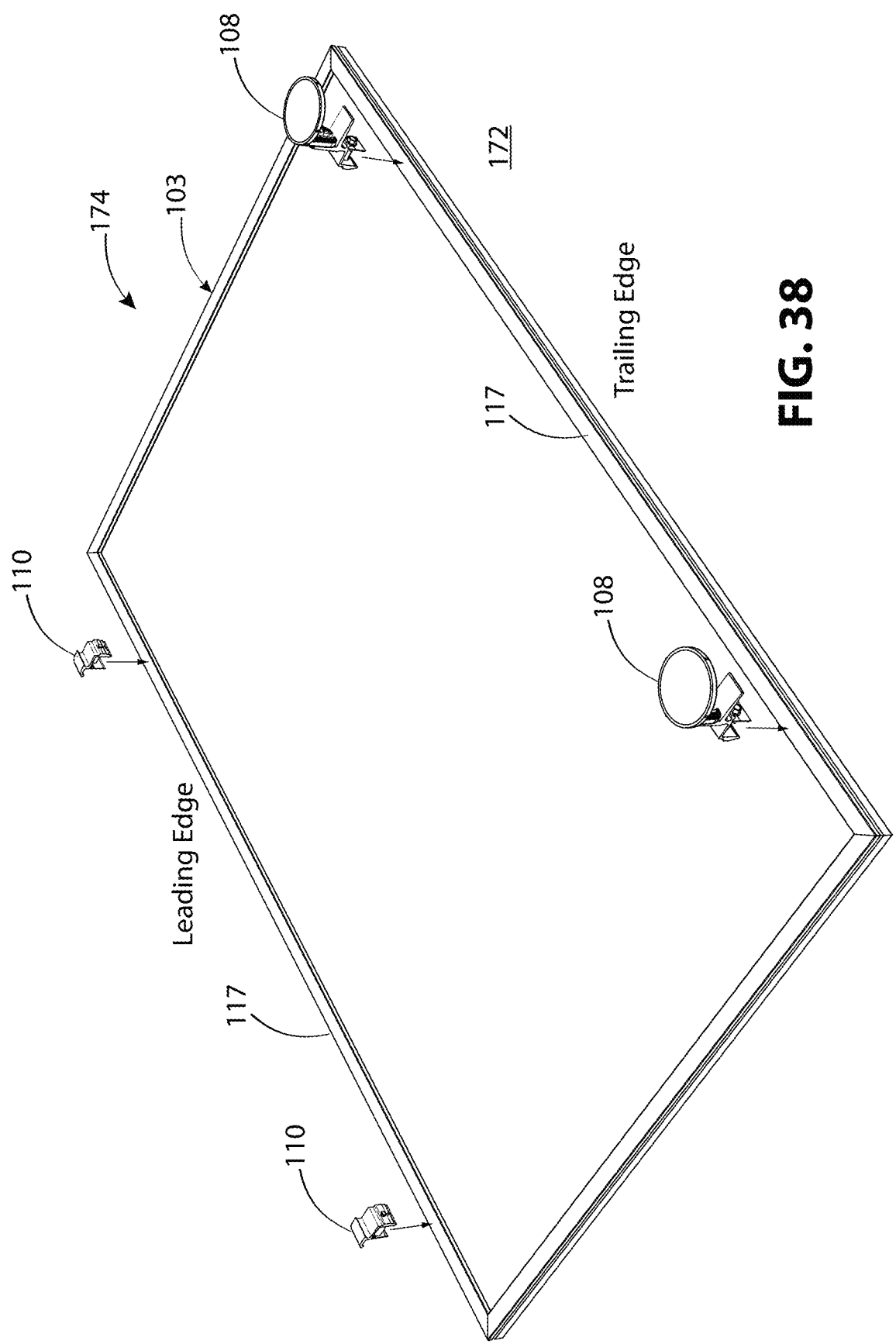
FIG. 38 illustrates, in perspective view, pre-attaching module hook clamps and universal-type module-roof attachment assemblies to the leading edge and trailing edge, respectively of a solar module frame.
Figure 39:
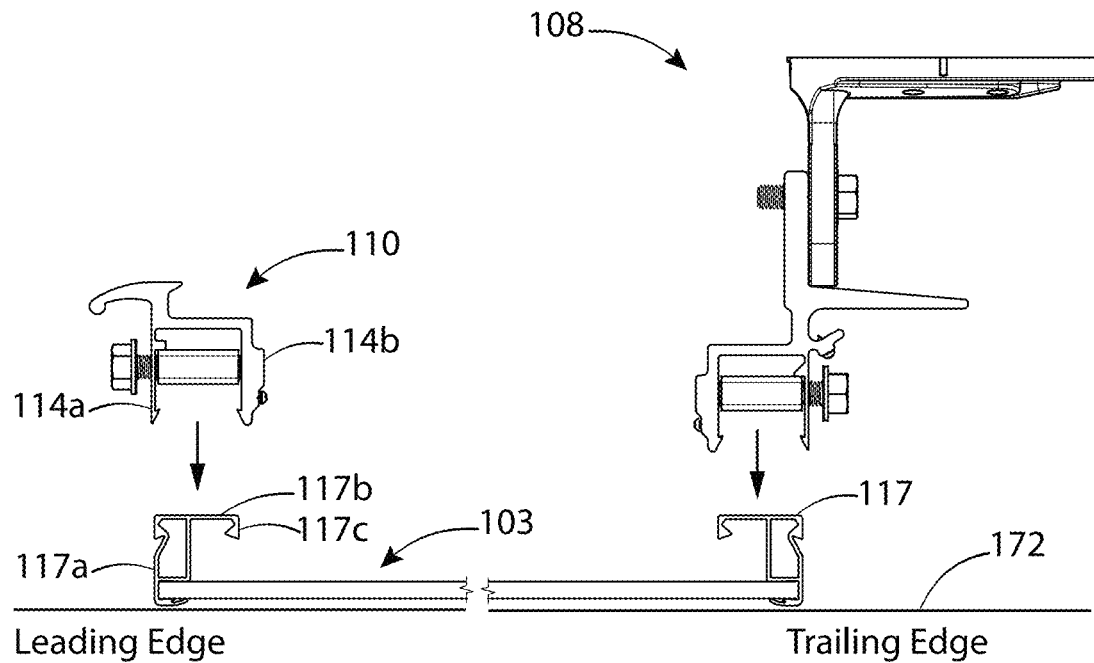
FIGS. 39 and 40 illustrate, in side view, a sequence of pre-attaching module-roof attachment assemblies and module hook clamp of FIG. 38.
Figure 40:
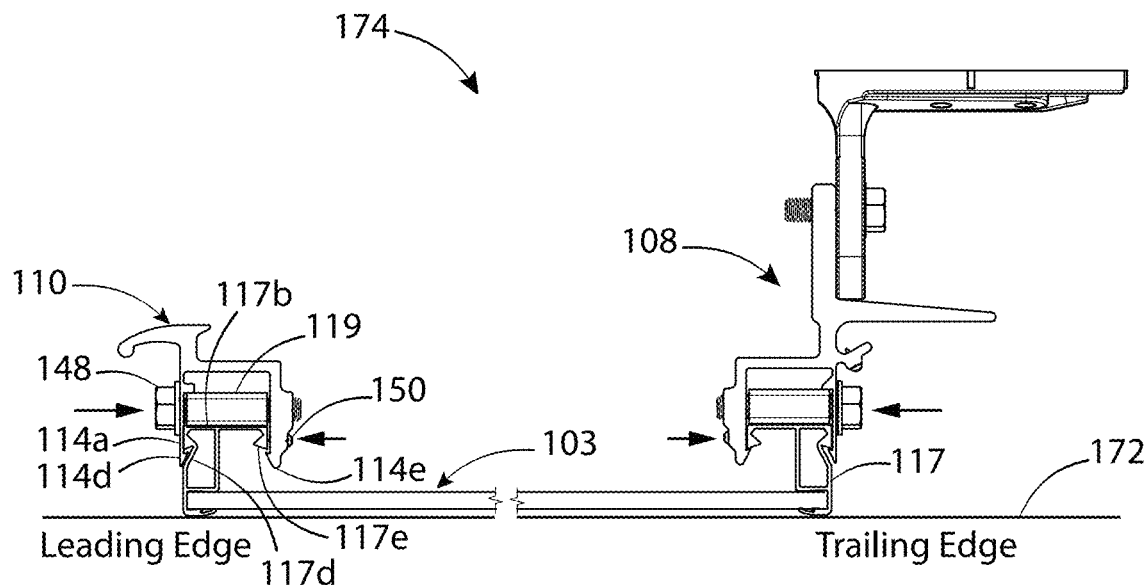

FIGS. 38-40 illustrate an example, of steps 200b and 200c from FIG. 34. FIG. 38 illustrates the attachment process in perspective view, and FIGS. 39 and 40 illustrate the attachment process in side view with portions of the solar module cutaway for clarity. Referring to FIG. 38, the solar module 103 is placed face down on a work surface 172, such as a driveway, carport, workbench, or the surface of a roof. Instances of module-roof attachment assembly 108 attach to the solar module frame 117 at the trailing edge of solar module 101. Instances of module hook clamp 110 attach to the solar module frame 117 at the leading edge of solar module 103. The completed assembly results in solar module assembly 174.

Referring to FIGS. 39 and 40, with the solar module 103 positioned on a work surface 172, the installer installs an instance of the module-roof attachment assembly 108 to the trailing edge of the solar module frame 117 as described for solar module 101 in FIGS. 36 and 37 for step 200a.

Referring to FIG. 39, the installer aligns the first clamp arm 114a and second clamp arm 114b of the module hook clamp 110 over the leading-edge side of the return flange 117b. The installer pushes the first clamp arm 114a and second clamp arm 114b over the outward-facing surface 117a and the return flange end, respectively of the solar module frame 117. The return flange end, as illustrated, includes the upward-projected portion 117c. The first clamp arm 114a splays outward while both clamp arms are pushed over the solar module frame 117. Referring to FIG. 40, with first hook 114d and second hook 114e engaged within the first detent 117d and second detent 117e respectively, the first clamp arm 114a springs back toward its resting position. The module hook clamp 110 is held to the solar module frame 117 by spring tension. The return flange 117b rests against the spacer 119. The installer may then tighten threaded fastener 148 to create additional clamping force on the first detent 117d and second detent 117e. The installer also may tighten bonding screw 150 to create an electrical bond between the clamp body 114 and the solar module frame 117.

Figure 41:
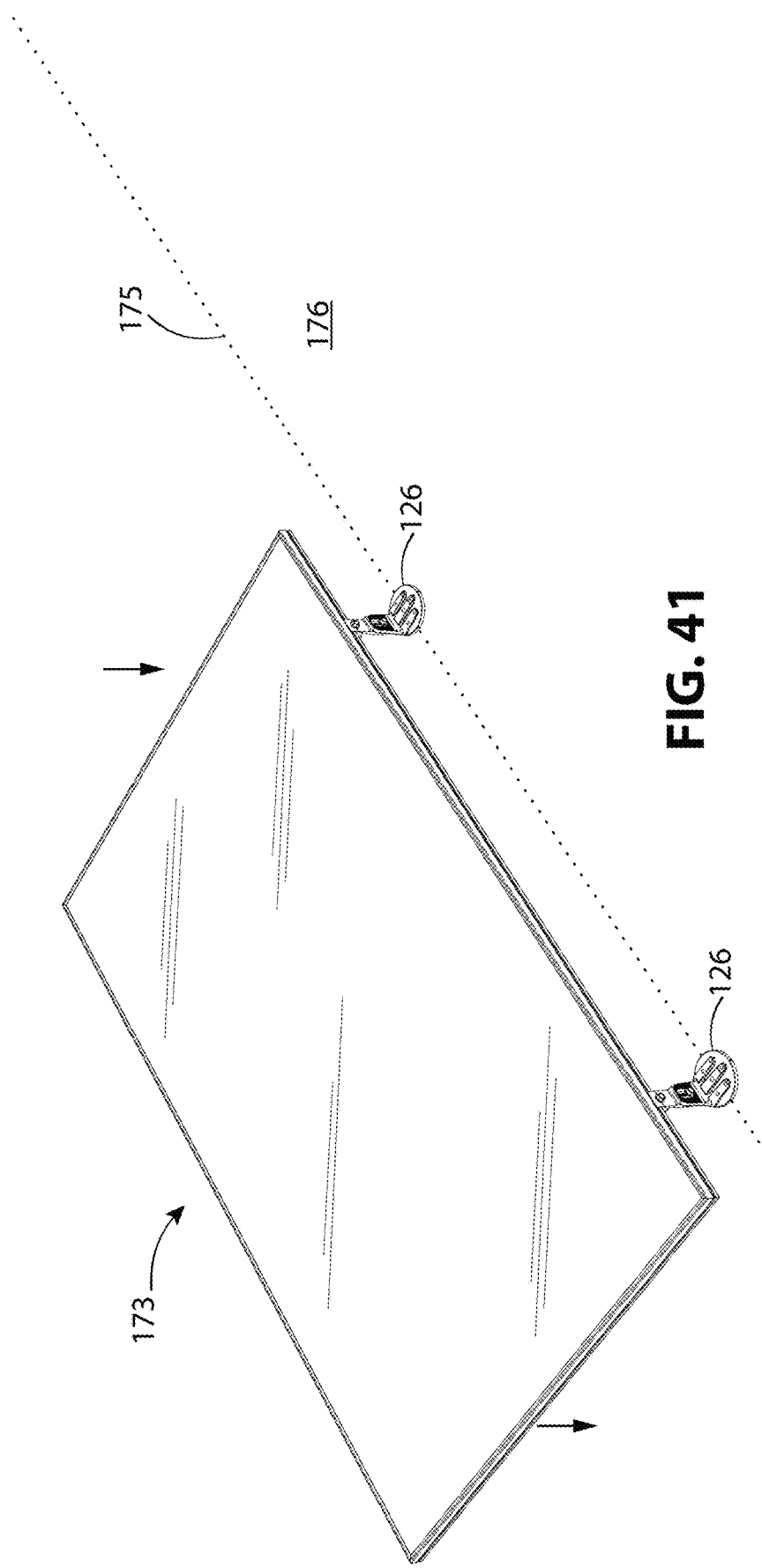
FIG. 41 illustrates, in perspective view, placing the first solar module assembly on the roof surface.
Figure 42:
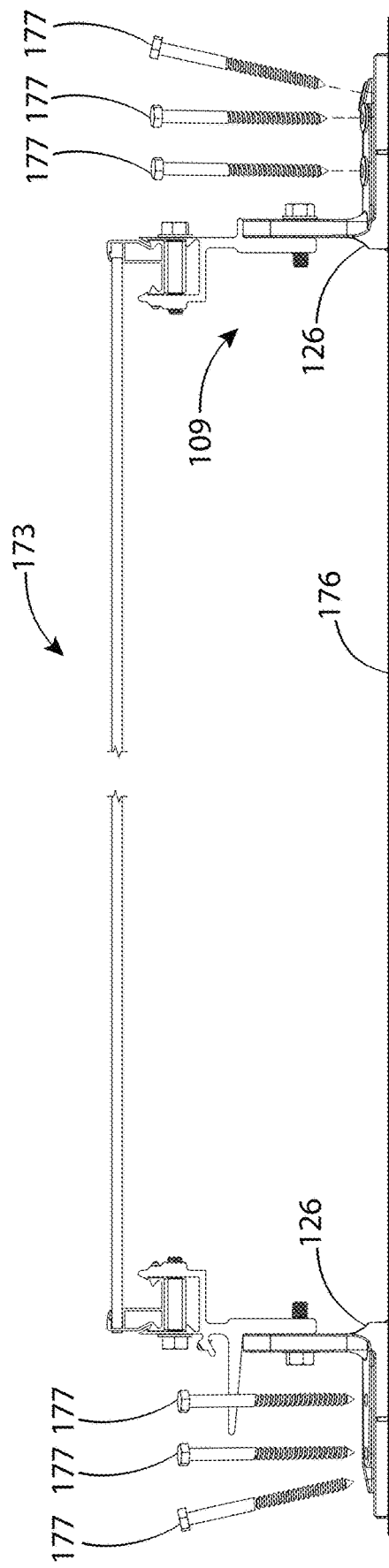
FIG. 42 illustrates, in side view, securing the first solar module assembly on the roof surface.

Referring to FIG. 33, in step 201, the installer places and secures the first of the first-row type solar module assemblies to the roof, creating a leading-edge row. Referring to FIG. 41, the installer may use a reference line 175, such as a chalk line, to place the first row of solar module assemblies. The installer than may simply place the solar module assembly 173, "feet down" on the roof 176, with roof attachment bracket 126 on the leading edge of the solar module assembly 173 aligned with the reference line 175. Referring to FIG. 42, the installer secures the solar module assembly 173 to the roof 176 by securing instances of the roof attachment bracket 126 using instances of threaded fastener 177. The threaded fastener 177 is typically a deck screw, a lag bolt, or other threaded fastener. Any threaded fastener may be used that is suitable for securing roof attachment brackets to a roof and can withstand being pulled out of the roof by wind uplift according to local, regional, or national building codes.

Figure 43:
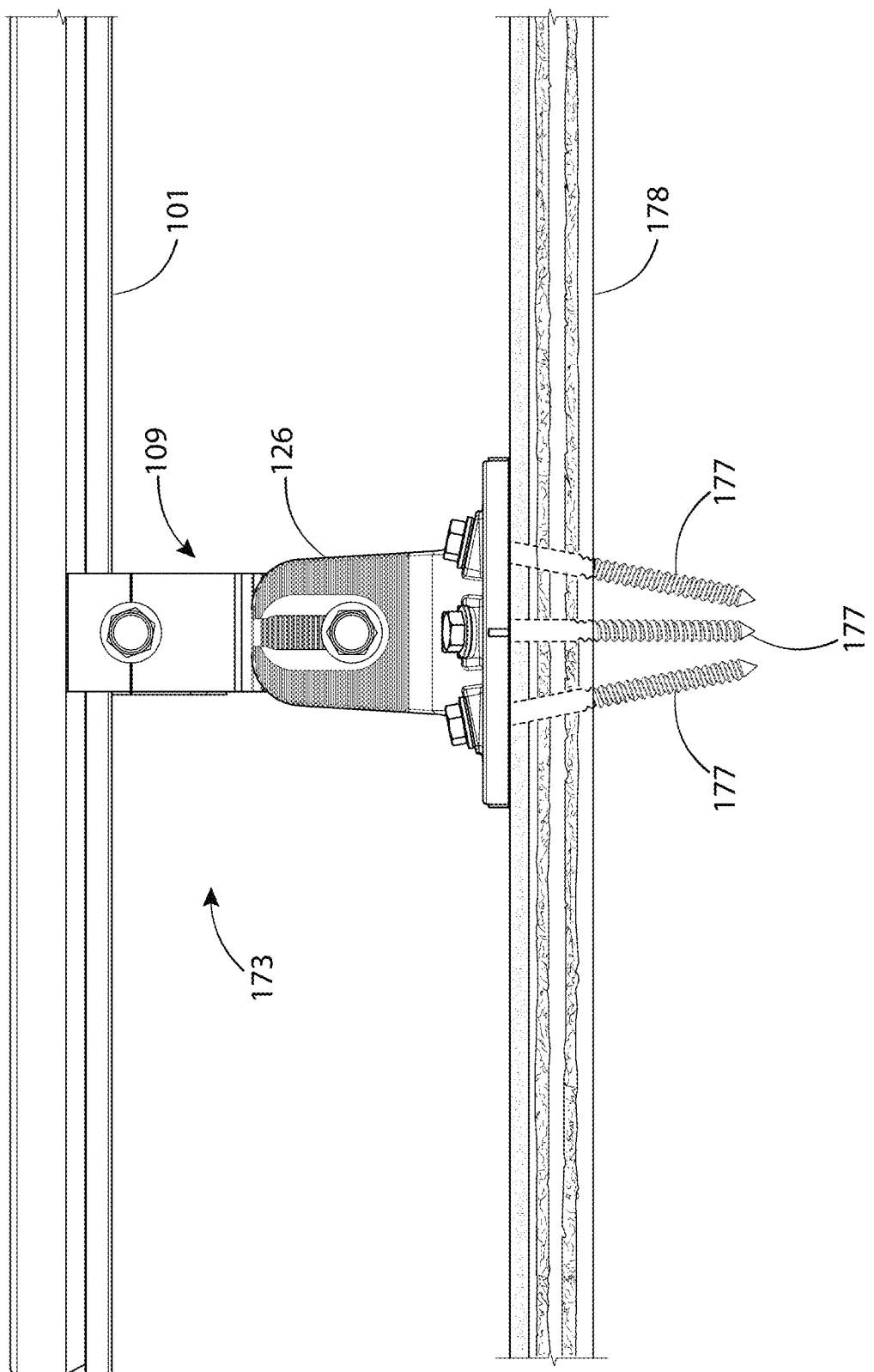
FIG. 43 illustrates in front view, a solar module assembly with the roof attachment bracket secured to the roof deck, with elements below the roof line cutaway for clarity.
Figure 44:
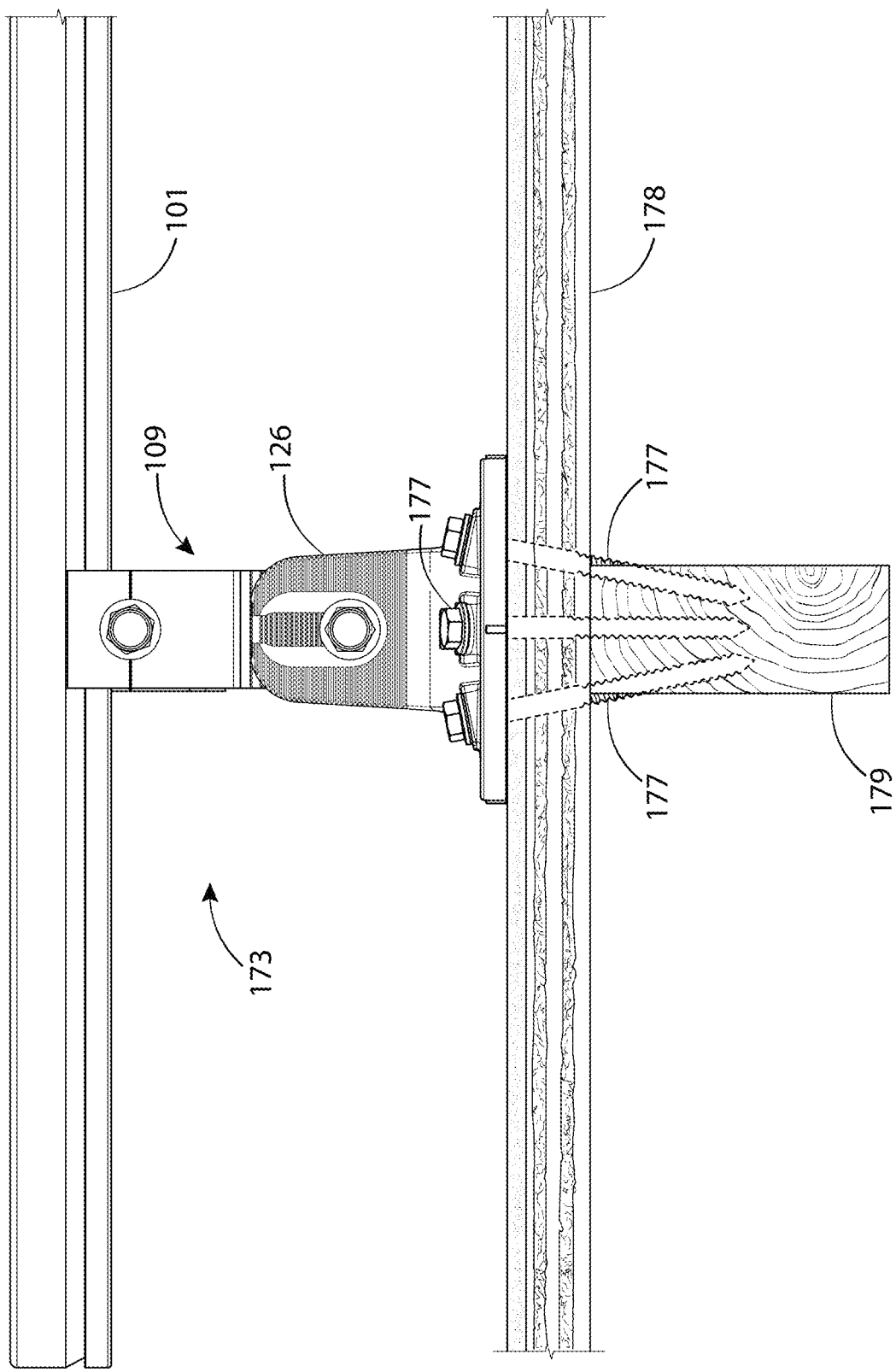
FIG. 44 illustrates, in front view, a solar module assembly with the roof attachment bracket secured to a roof rafter, with elements below the roof line cutaway for clarity.

Referring to FIGS. 43 and 44, the solar module assembly 173 and other solar module assemblies of the present disclosure can be deck-mounted or rafter-mounted. In a deck-mounted installation, the installer can place the roof mounting assemblies anywhere on the roof deck. This has the advantage of simplicity of installation. In a rafter-mounted installation, the roof attachment brackets are aligned over roof rafters or the top cord of roof trusses. Rafter-mounted installations requires alignment with roof rafters, making the installation more complex than deck-mounted installations. However, some installations and jurisdictions require rafter-mounted systems.

FIG. 43 illustrates an example of deck mounting the solar module assembly 173. The roof attachment bracket 126 of the module-roof attachment assembly 109, can be positioned anywhere on the roof deck 178. Instances of threaded fastener 177 extend through the roof attachment bracket 126 and attach the solar module 101 to the roof deck 178. Note that roof attachment bracket 126 is designed for both deck mounting and rafter mounting, and is the subject of the Applicant's U.S. Pat. No. 11,750,143, issued on Sep. 5, 2023 and hereby incorporated by reference.

Figure 45:
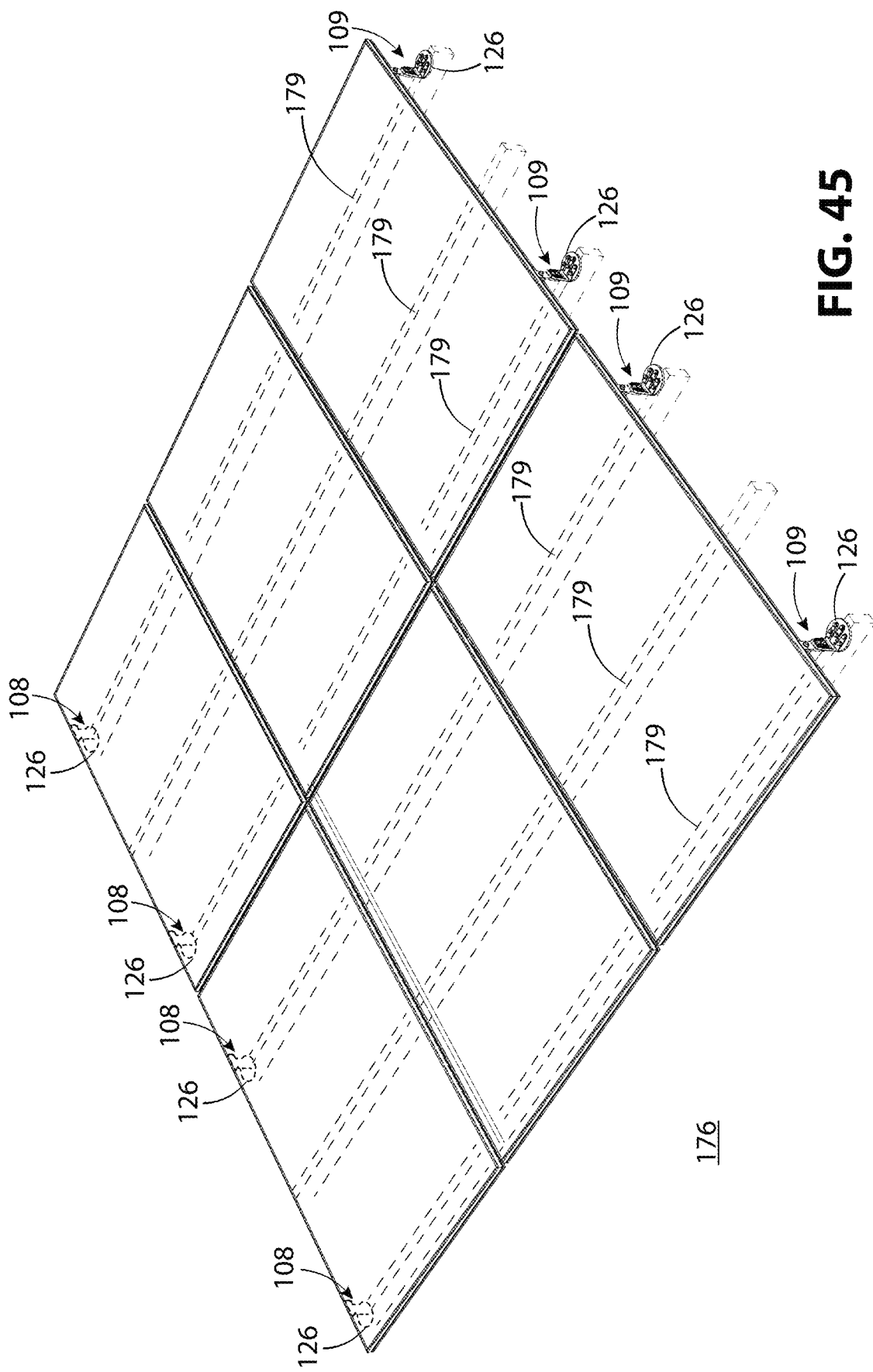
FIG. 45 illustrates, in perspective view, a solar module system with the roof attachment brackets attached to roof rafters, the roof rafters are shown in dashed lines to indicate they are hidden beneath the roof surface.

FIG. 44 illustrates an example of rafter mounting the solar module assembly 173. The roof attachment bracket 126 of the module-roof attachment assembly 109 is positioned over a rafter 179. Instances of threaded fastener 177 extend through the roof attachment bracket 126, through the roof deck 178 and into the rafter 179, and attach the solar module 101 to the roof deck 178. FIG. 45 shows instances of roof attachment bracket 126 of the module-roof attachment assembly 108 on the trailing edge of the solar module system 100. FIG. 45 also shows instances of roof attachment bracket 126 of the module-roof attachment assembly 109 on the leading edge of solar module system 100 aligned along corresponding instances of rafter 179. The instances of rafter 179 are shown in dashed lines indicating that they are hidden from view under the surface of the roof 176. Note that other instances of the module-roof attachment assembly 108 secured to the trailing edge of the interior solar module are also aligned with the instances of the rafter 179. These are not shown in FIG. 45 for simplicity.

Figure 46:
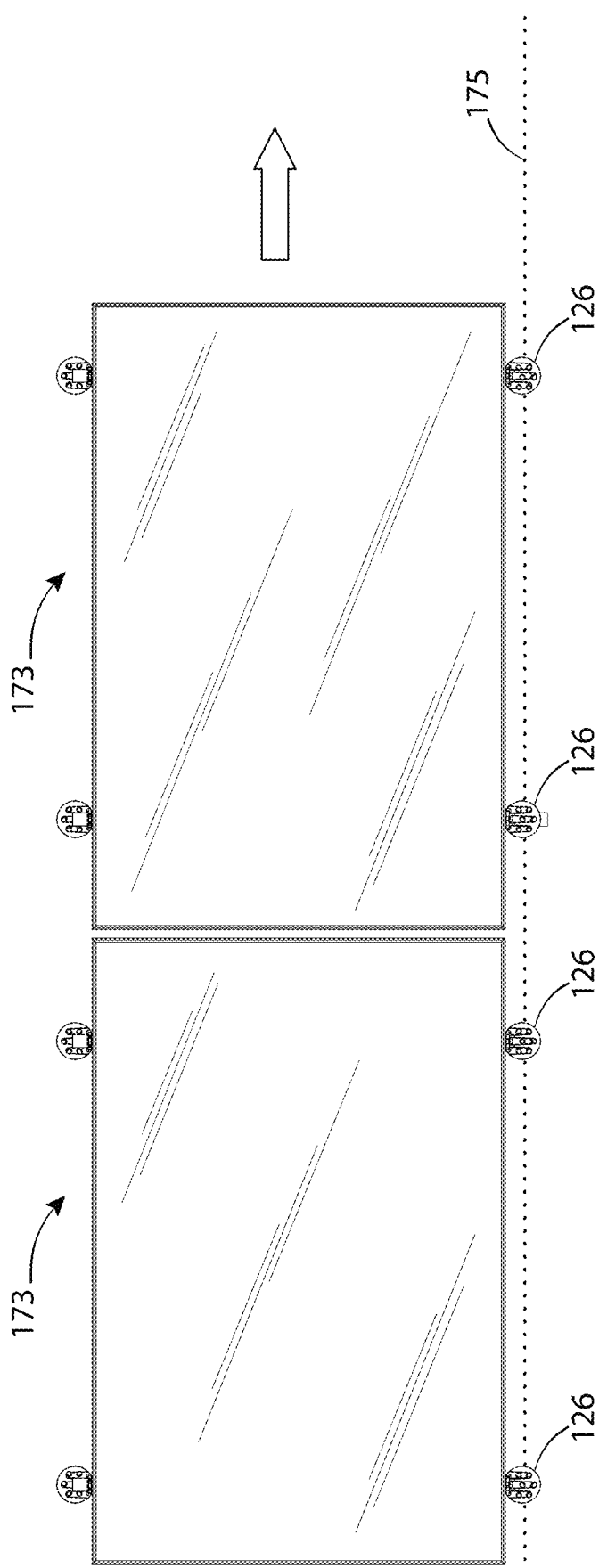
FIG. 46 illustrates, in top view, assembling the first row of solar module assemblies aligned to a reference line, such as a chalk line, on the roof.
Figure 47:
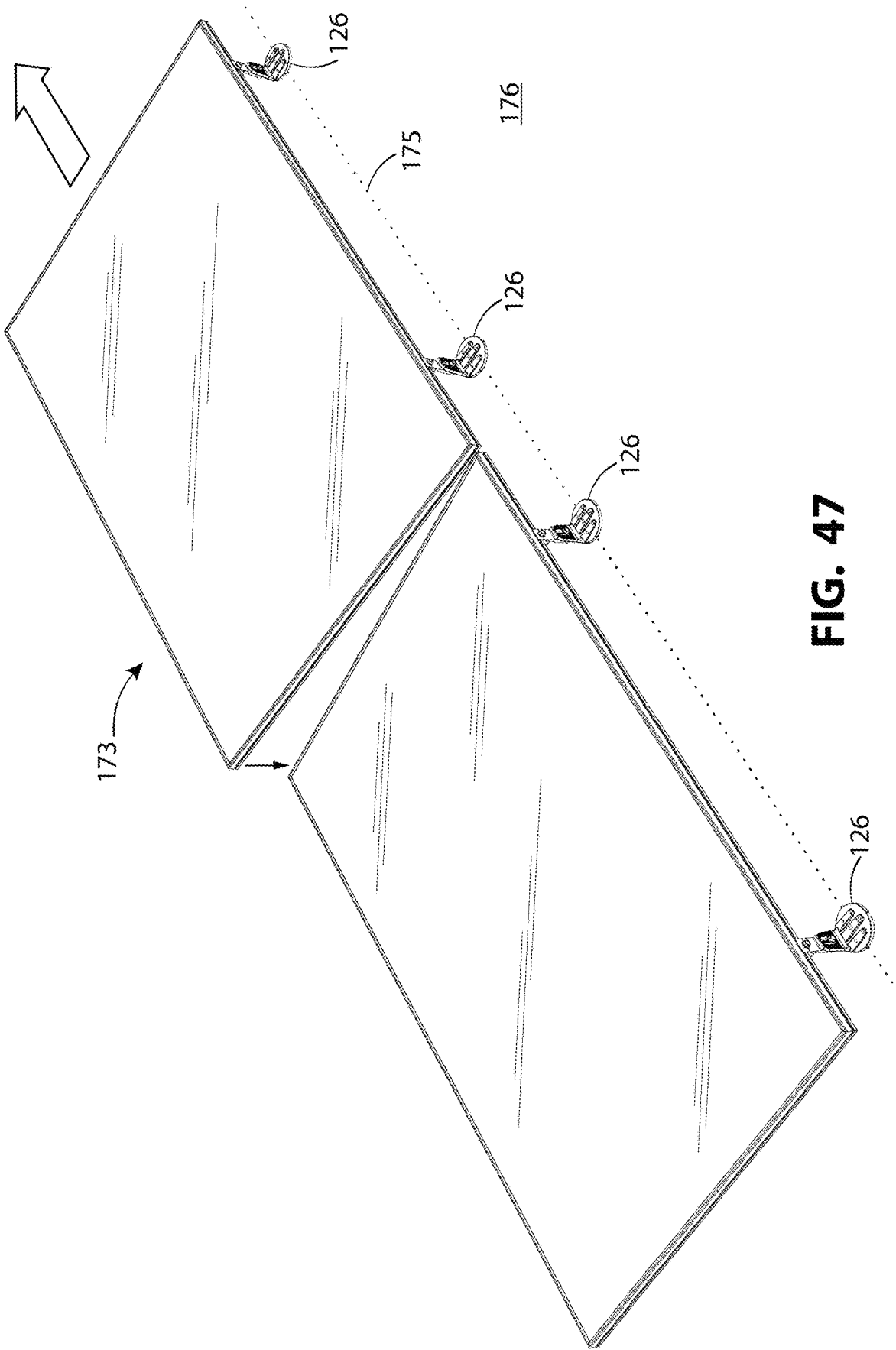
FIGS. 47 and 48 illustrate, in front perspective view (FIG. 47) and rear perspective view (FIG. 48), placement of a second solar module assembly within the first row of solar module assemblies.
Figure 48:
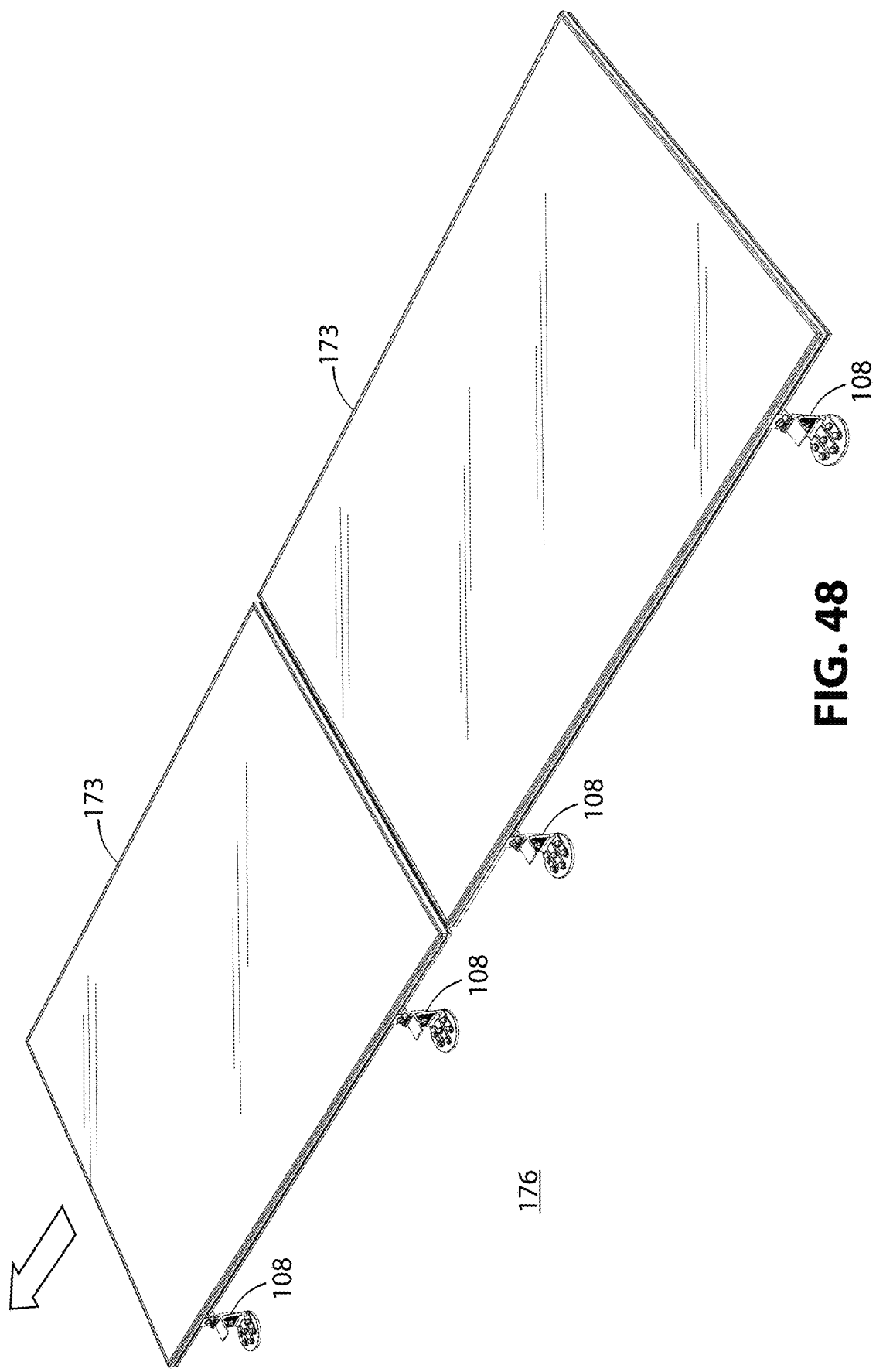

Referring to FIG. 33, in step 202, the installer places and secures additional first-row type solar module assemblies in the leading-edge row of the solar module system, creating an installed row. FIG. 46 illustrates, in top view, a first and second instance of solar module assembly 173, with instances of roof attachment bracket 126 on the leading edge of the solar module assemblies, aligned along the reference line 175. Additional instances of solar module assembly 173 in the leading-edge row may be placed in the same way and secured to the roof 176 as described for FIG. 42. The installer may place the additional instances of solar module assembly 173 on the roof 176 as they see fit. For example, the installer may place the solar module assembly 173 straight down on the roof 176. Alternately, as shown in FIG. 47, they may first place the leading edge-mounted instances of the roof attachment bracket 126 on the roof 176 along the reference line 175, and pivot the solar module assembly 173 in place. FIG. 48 illustrates, in rear perspective view, the resultant assembly of two instances of solar module assembly 173, with the module-roof attachment assembly 108 secured to the roof.

Figure 49:
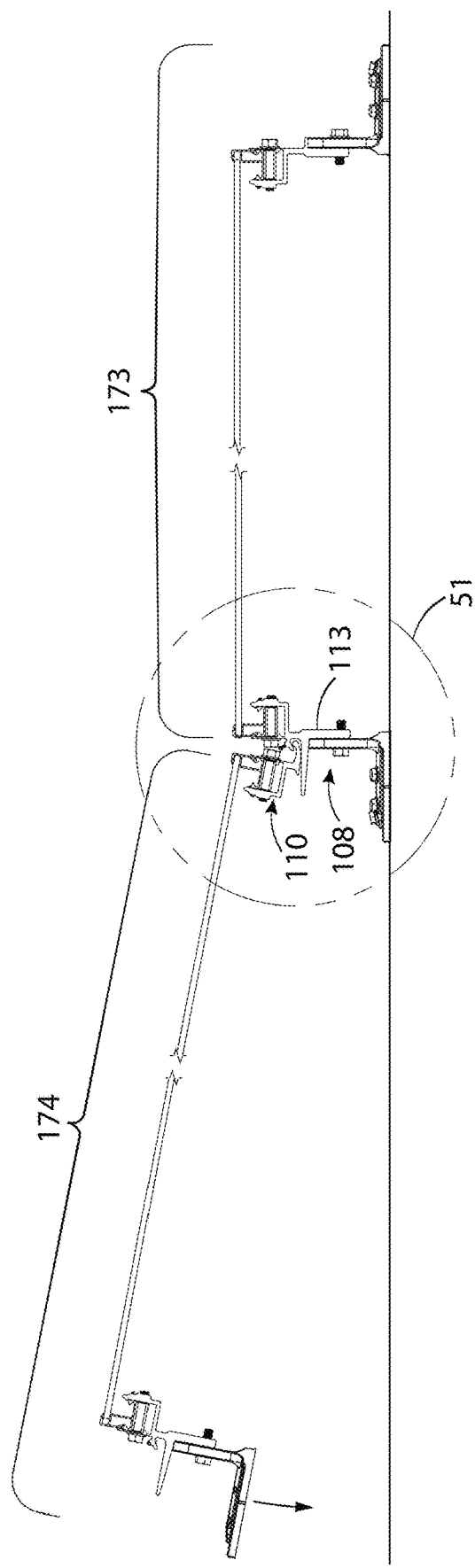
FIGS. 49 and 50 illustrate, in side view, and rear perspective view, respectively, placement of the first solar module assembly within the second row of solar module assemblies.
Figure 50:
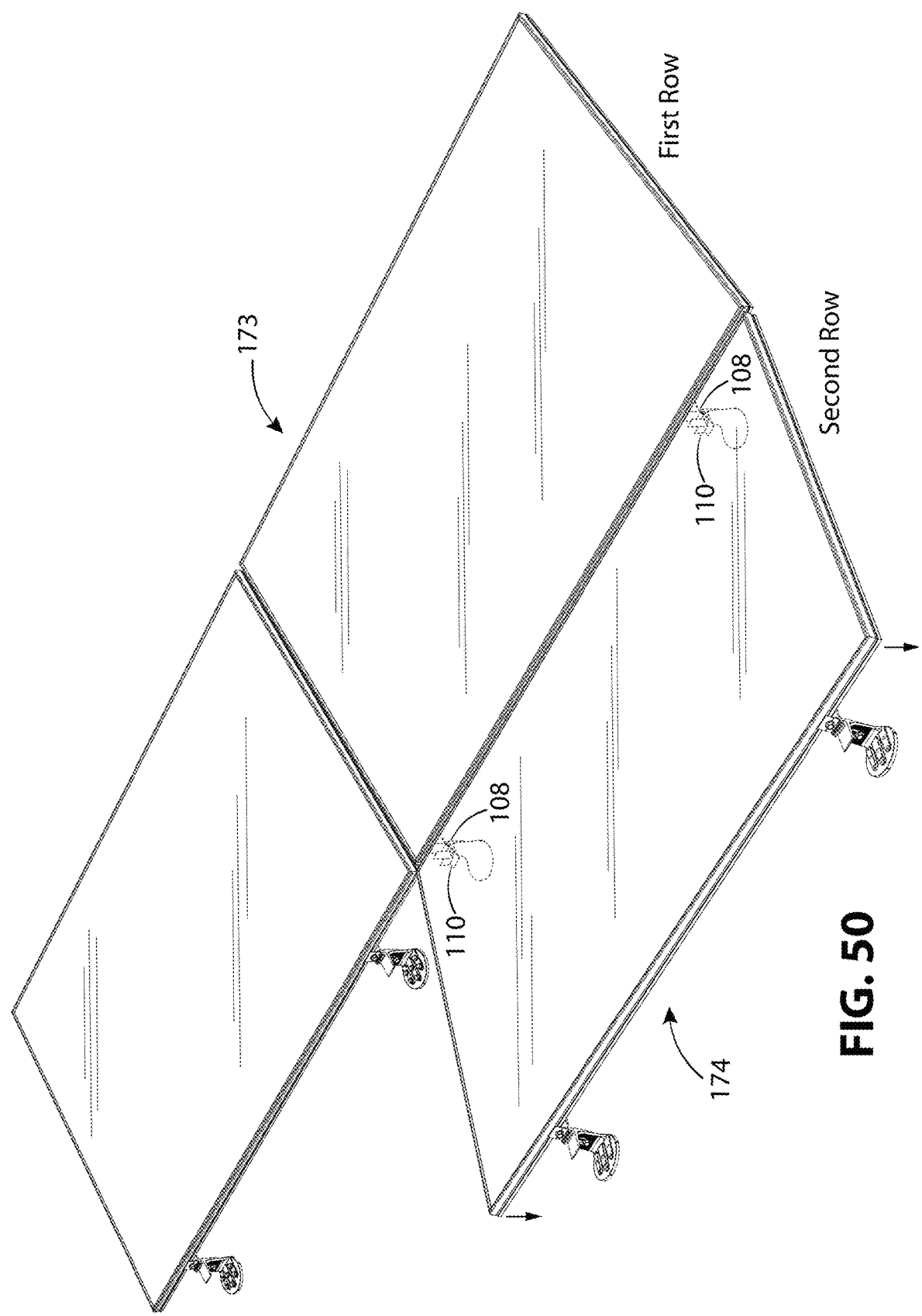

Referring to FIG. 33, in step 203, the installer secures the interior-row type solar module assemblies to an immediately adjacent row of solar module assemblies, by engaging module hook clamps attached to the leading edge of the immediately adjacent row of solar module assemblies, to universal-type module-roof attachment assembly attached to the trailing edge of the interior-row type solar module assemblies, creating an interior-row. FIG. 49 illustrates, in side view, solar module assembly 174 being attached to the solar module assembly 173 that was secured to the roof 176 in FIG. 42. The module hook clamp 110 pivoted within the bracket body 113 of the module-roof attachment assembly 108. FIG. 50 shows this in rear perspective view, where instances of solar module assembly 173 in the first row are secured to the roof. The first instance of the solar module assembly 174 is being pivoted in place. FIG. 50 shows the module hook clamp 110 and module-roof attachment assembly 108, between the first row of solar module assembly 173, and solar module assembly 174, in dashed lines to indicate that they are hidden from view.

Figure 51:
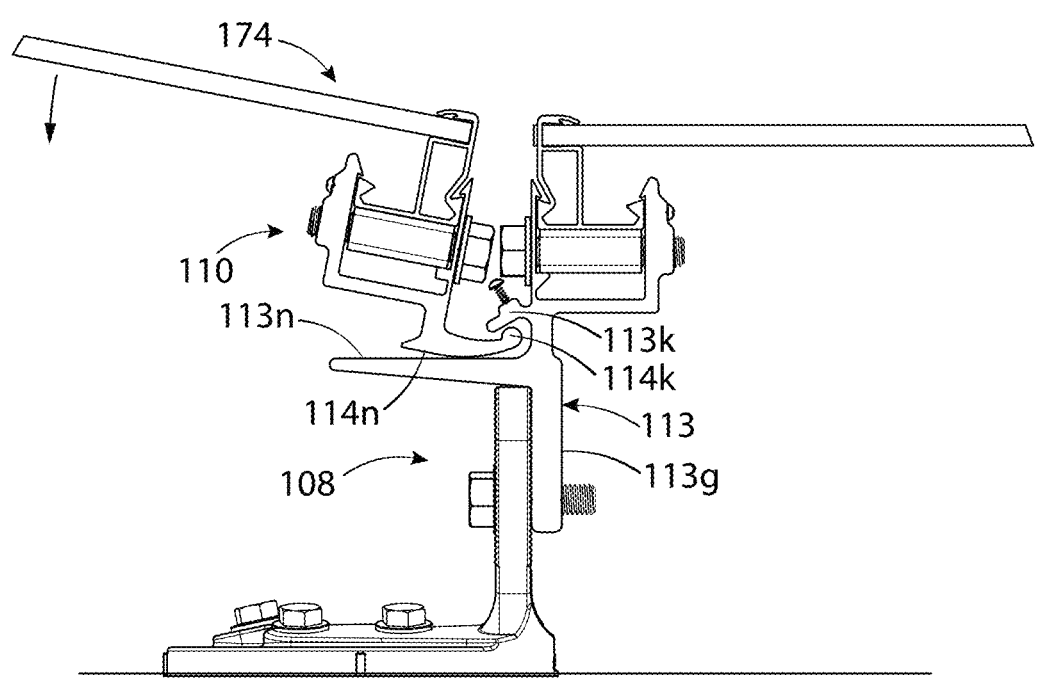
FIG. 51 illustrates an enlarged portion of FIG. 49 showing how the module hook clamp interfaces with the module attachment bracket.

FIG. 51 shows an enlarged view of the bracket body 113 of the module-roof attachment assembly 108, and the module hook clamp 110 from FIG. 49, showing how these components interface during assembly. Referring to FIG. 51, the open end 114k of the hook arm 114n, illustrated as a ball hook catch, pivots within the hook arm receiver 113k of the bracket body 113. At the same time, the hook arm 114n, which is a generally curve-shaped seating surface, pivots along platform 113n. The top surface of the platform 113n may be angled downward toward the riser 113g, i.e., at an obtuse angle with respect to the portion of the riser 113g positioned below the platform 113n. The sloping of the platform 113n helps to facilitate pivoting and securing of the open end 114k within the hook arm receiver 113k.

Figure 52:
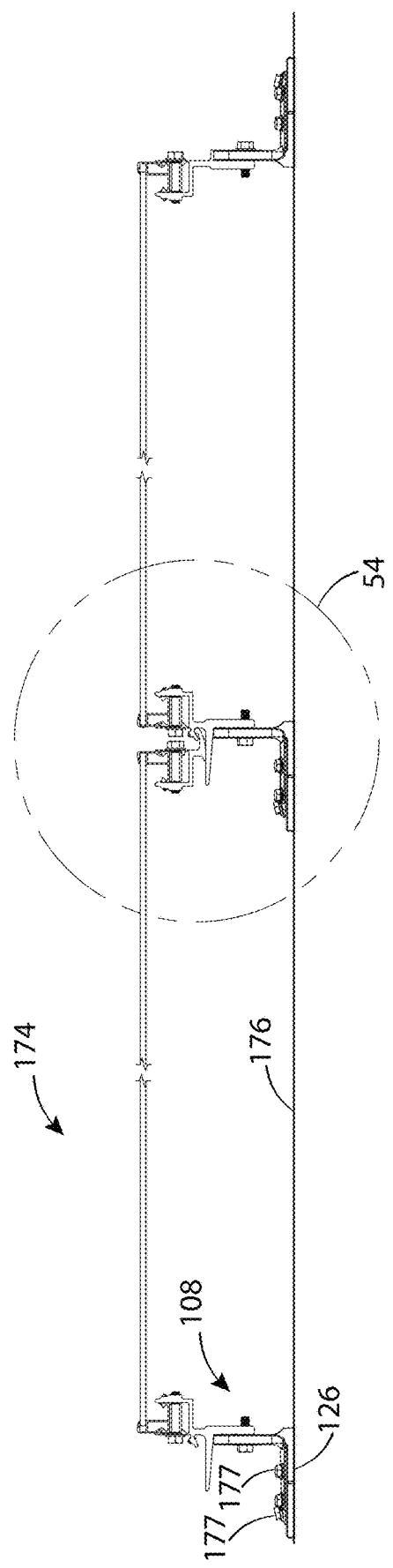
FIGS. 52 and 53, illustrate, in side view and rear perspective view, respectively, placement of the solar module assembly of FIG. 49 against the roof.
Figure 53:
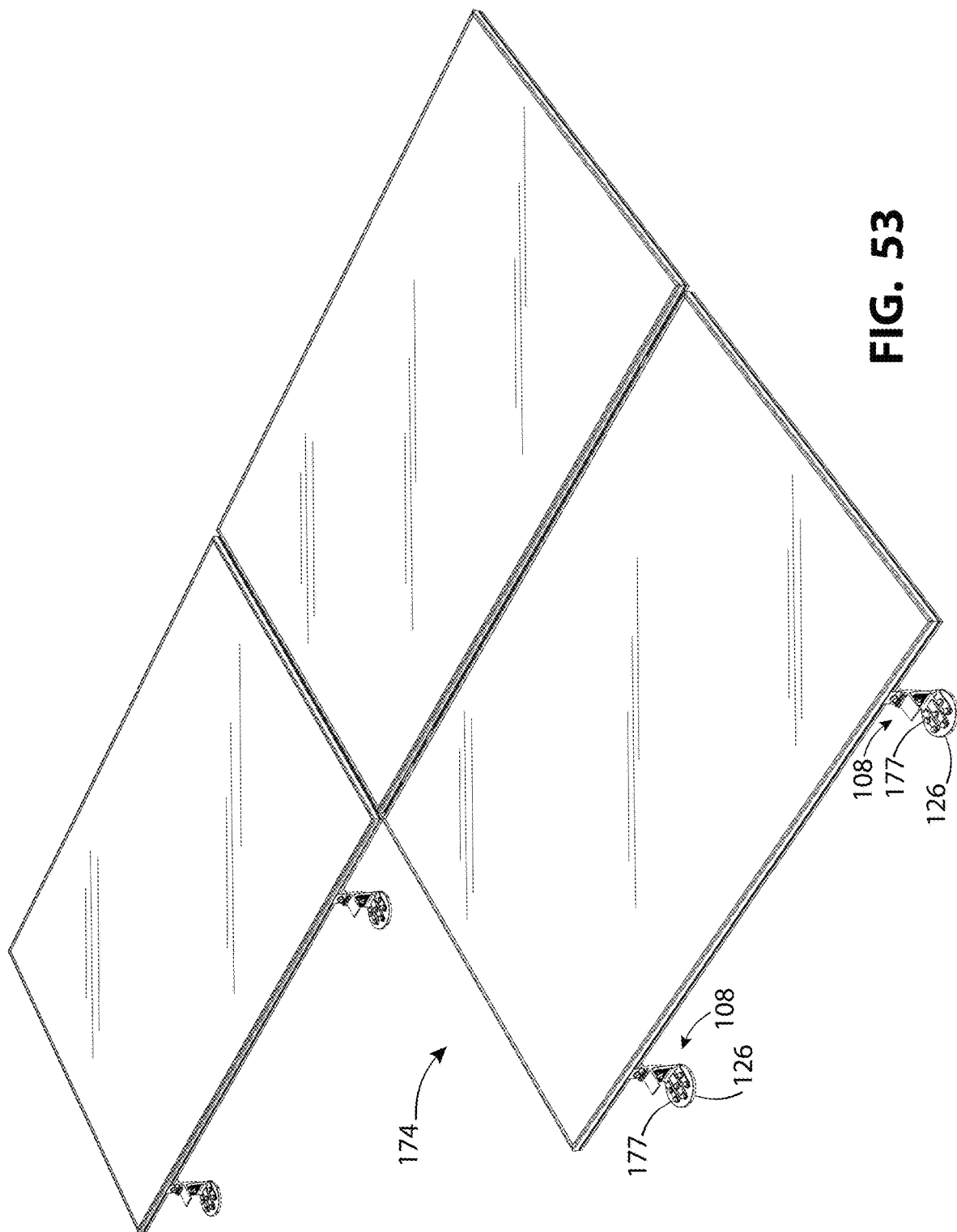

Referring to FIG. 33, in step 204, the installer secures the interior-row type solar module assemblies by securing the universal-type module-roof attachment assemblies to the roof. In FIGS. 52 and 53, the installer secures the roof attachment bracket 126 of module-roof attachment assembly 108. The module-roof attachment assembly 108 is attached to the trailing edge of solar module assembly 174. The roof attachment bracket 126 is attached to the roof 176 using instances of threaded fastener 177. Details on how to attach threaded fastener 177 is described in FIG. 42-44.

Figure 54:
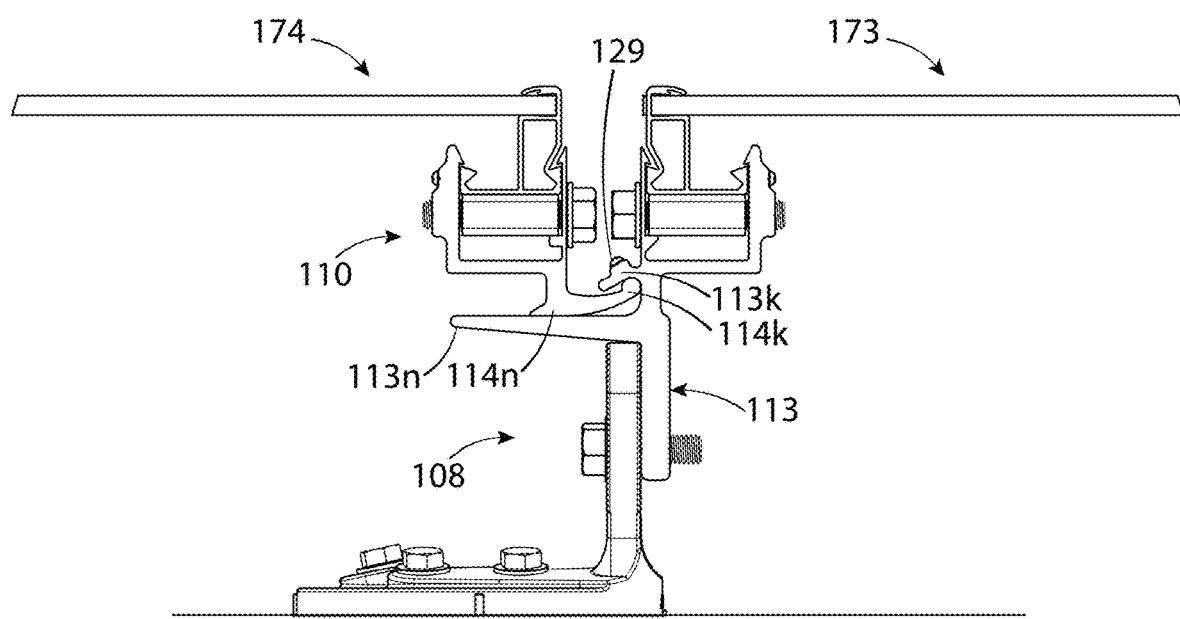
FIG. 54 illustrates an enlarged portion of FIG. 52 showing how the module hook clamp locks into the hook arm receiver of the module attachment bracket when the module-roof attachment assemblies are placed against the roof.
Figure 55:
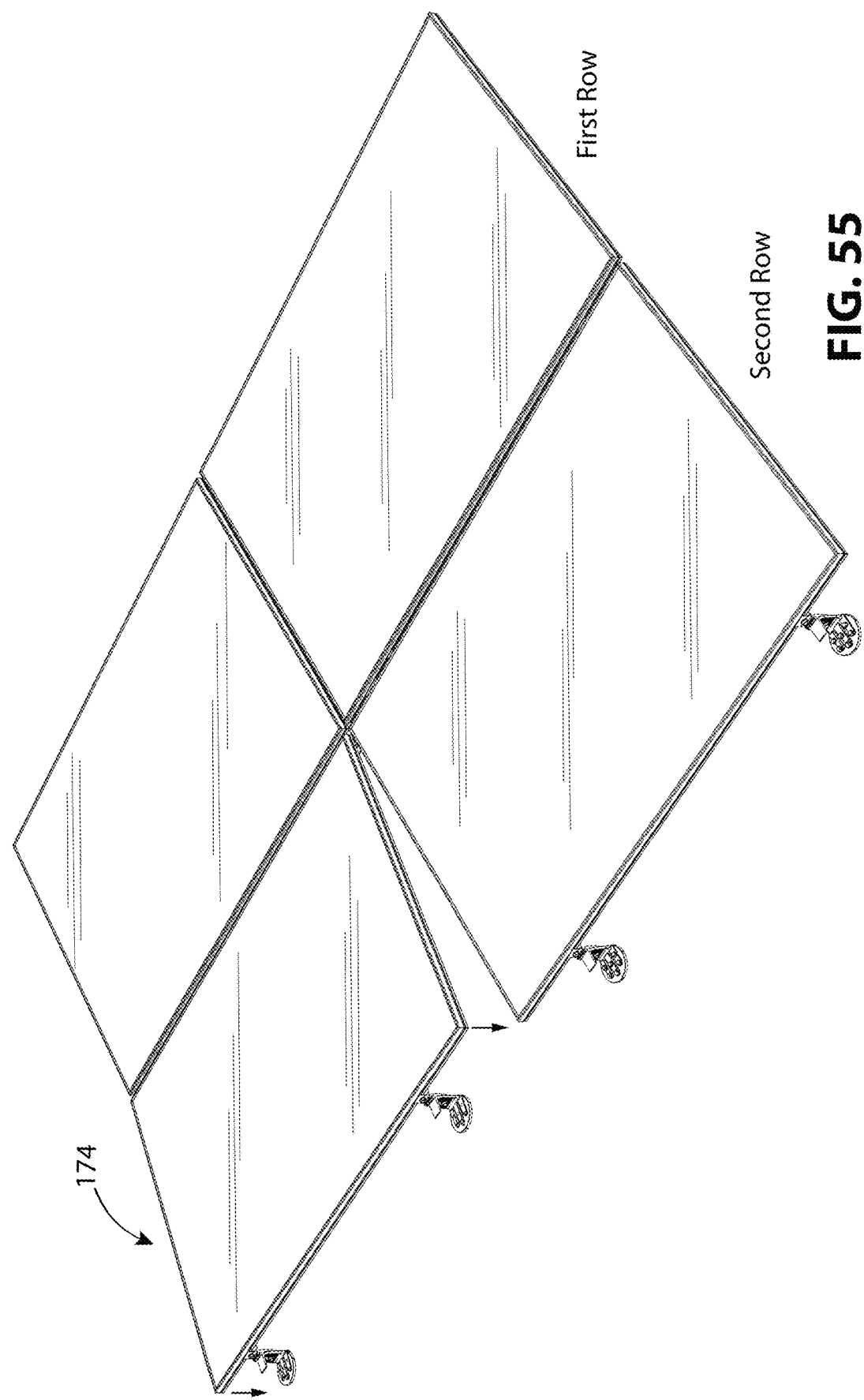
FIG. 55 illustrates, in rear perspective view, positioning the second solar module assembly in the second row.

FIG. 54 shows an enlarged view of bracket body 113 of module-roof attachment assembly 108, and module hook clamp 110, showing how these components interface after assembly. Referring to FIG. 54, the open end 114k, illustrated as a ball hook catch, of the hook arm 114n, pivots within the hook arm receiver 113k of the bracket body 113. The end portion of the hook arm receiver 113k extending downward toward the platform 113n, helps to retain the open end 114k within the hook arm receiver 113k. At the same time, the hook arm 114n pivots along platform 113n. The hook arm 114n may be a generally curve-shaped seating surface, and is illustrated as having a downward-facing generally convex shape. The sloping of the platform 113n, as previously discussed, helps to prevent movement of the solar module assembly 174 while it is being secured. The installer may electrically bond module-roof attachment assembly 108, solar module assembly 173, module hook clamp 110, and solar module assembly 174, by tightening the bonding screw 129 against the open end 114k of the hook arm 114n. Referring to FIG. 55, the remaining instances of solar module assembly 174 in the second row can be installed in the same way.

Figure 56:
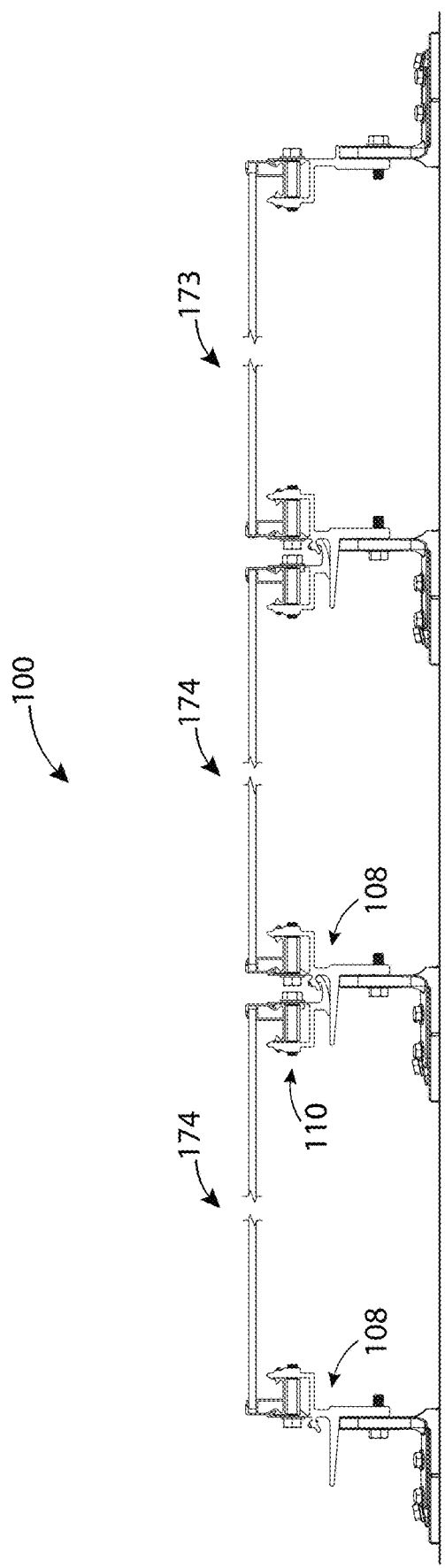
FIG. 56 illustrates, in side view, the resulting solar module assembly after securing the third row of modules.

Referring to FIG. 33, in step 205, the installer secures the last row of solar module assemblies by engaging module hook clamps attached to the last-row to module-roof attachment assemblies attached to the immediately adjacent row of solar module assemblies. In step 206, the installer secures the last row of solar module assemblies by securing the trailing-edge mounted module-roof attachment assemblies to the roof. FIG. 56 illustrates, in side view, solar module system 100 with three rows, the first row, or leading-edge row with instances of solar module assembly 173, the second row with instances of solar module assembly 174, and the third row, with additional instances of solar module assembly 174. The module hook clamp 110 of the third row is secured to the module-roof attachment assembly 108 of the second row, in the same way as described in FIGS. 49-55 for the second row. Note that the last row in the solar module assembly can include end-clamp type module-roof attachment assemblies, such as module-roof attachment assembly 109, in place of the universal-clamp type module-roof assemblies, module-roof attachment assembly 108.

Conclusion and Variations

The Summary, Detailed Description, and figures described devices, systems, and methods for attaching solar module assemblies to roofs. This disclosure provides examples of devices, components, and configurations to help the reader understand the described general principles. The following are examples of variations and combinations of different components, structures, and features that still adhere to the general principles.

Module-roof attachment assembly 108 and module-roof attachment assembly 109 are illustrated with roof attachment bracket 126 in FIGS. 8 and 14, respectively. Roof attachment bracket 126 is illustrated as an L-foot adapter. One advantage of the illustrated L-foot adapter is its ability to be used in both rafter mount and deck mount installations. For deck mount installations, an installer could substitute an L-foot, an L-bracket, or other roof attachment bracket specifically structured for deck mounting. For rafter mount installations, an installer could substitute an L-foot, an L-bracket, or other roof attachments specifically structured for rafter mounting. For metal roof applications, an installer could substitute an L-foot, L-bracket, or other roof attachment brackets specifically structured for metal roofs. For example, an installer could choose the mounting device of FIG. 5 of the Applicant's U.S. Pat. No. 11,848,638 in place of roof attachment bracket 126, for metal roof applications. As another example, an installer could also use the roof mount bracket illustrated in U.S. Pat. No. D983,018 in place of roof attachment bracket 126 for metal roof application.

The roof attachment bracket 126 of FIGS. 8 and 14 is illustrated with a slot-shaped opening 126a. The slot-shaped opening helps to facilitate sliding the roof attachment bracket 126 on and off the bracket body 113 (FIG. 8) and bracket body 115 (FIG. 14). An installer might opt to use a roof attachment bracket with a riser that includes a closed slot-shaped aperture in place of the slot-shaped opening. Alternatively, an installer might choose a roof attachment bracket with a riser that includes a circular aperture or series of vertically aligned circular apertures.

The roof attachment bracket can have additional variations. For example, the roof attachment bracket could have a rectangular base or a rectangular riser. The roof bracket could be a T-foot, a pedestal, a pedestal with a flange portion for attaching threaded fasteners to the building surface, and a slotted pedestal to allow for height adjustment. Other equivalent structures could be substituted as long as they are capable of being secured to the roof or building structure with sufficient holding force to withstand normal environmental conditions for solar module systems, and are capable of being used in accordance with the disclosed assembly methods.

The module hook clamp 110 illustrated throughout this disclosure includes a seating platform with a generally curve-shaped seating surface. This generally curve-shaped seating surface in FIG. 51, for example, is the hook arm 114n which is a generally convex-shaped seating surface with respect to the platform 113n. The generally curve-shaped seating surface can be a continuous smooth curve, formed from piece-wise linear segments, formed from piece-wise curved segments, or formed from piece-wise curved segments and piece-wise linear segments. As an example, the hook arm 114n could form a generally curve-shaped seating surface that has a downward-facing generally convex shape where a portion of the seating surface is flat. This portion of the seating platform can be positioned to help resist movement once the open end 114k is engaged with the hook arm receiver 113k.

Referring to FIG. 21, one purpose of the riser 114g in the module hook clamp 110 is to position the height of the solar module so its top surface is co-planar with the adjacent solar module. An example of this is illustrated in FIG. 5, where the top of solar module 101 is co-planar with solar module 103. Referring to FIG. 23, it may be possible to eliminate the riser 114g of the module hook clamp 110 and still align top surfaces of the solar modules in the same plane by changing the position of the spacer 119, the first hook 114d, and the second hook 114e, to compensate for the elimination of the riser 114g, and keep the solar module top surfaces co-planar. It may also be possible to eliminate the riser if co-planar alignment is unnecessary.

The threaded fasteners illustrated throughout this disclosure are suggestive of what could be used. For example, the threaded fastener 127 and threaded fastener 128 of FIG. 9, the threaded fastener 137 and threaded fastener 138, of FIG. 15, threaded fastener 148 of FIG. 20, threaded fastener 157 and threaded fastener 158 of FIG. 28, and threaded fastener 167 and threaded fastener 168 of FIG. 31, are illustrated as hex head machine screws. This screw head style allows the installer to use a power tool such as an electric drill or impact driver. The Inventors envision that other types of screws could be used. For example, an installer could use socket head cap screws, pan-head screws, button-head screws, or round head screws. These can include hexagonal sockets, Phillips head sockets, slotted sockets, hi-torque sockets, square sockets, Robertson head sockets, or Torx head sockets. They can also include various custom or off-the-shelf security head screws. Any screw or bolt can be used that can perform the function specified in the specification, and provide enough holding strength to perform to typical environmental conditions expected for a solar module system installation.

The threaded fastener 177 illustrated in FIGS. 5, 6, and other figures throughout this disclosure typically are hex head decking screws. This screw head style is compatible with common power or hand tools. The installer could choose threaded roof fasteners with other head styles that suits either power tools or hand tools. For rafter installations, an installer may substitute a lag bolt or lag screw for added strength. An installer can substitute screws or bolts that can perform the specified function, provide a watertight seal, and provide enough holding strength to meet environmental and regulatory conditions expected for their installation.

Threaded apertures, such as threaded aperture 113*f* and threaded aperture 113*i* of FIG. 9, threaded aperture 115*f* and threaded aperture 115*i* of FIG. 15, threaded aperture 114*i* of FIG. 20, and threaded aperture 116*i* of FIG. 28, can be directly threaded into their respective bracket body arms and clamp arms. They may be indirectly threaded, for example, by using a threaded insert.

FIGS. 9, 20, 15, and 28 illustrate the spacer 118, spacer 119, spacer 120, 121, respectively, as a substantially rectangular prism, or cuboid, with filleted edges. The spacer could be other shapes. For example, it could include convex or concave sides with planar or partially planar top or bottom surfaces. These spacers could be narrower or wider to contact less or more surface area of the solar module return flange. The spacer top surface and bottom surface are illustrated as planar, but could be other shapes to accommodate other solar module frame styles. For example, the spacer could include a keyway extending lengthwise along its top surface to interface with a frame slot in the bottom of a return flange of a solar module frame. An example of a frame slot in the return flange of the solar module frame is shown in FIG. 15 of the Applicant's U.S. Pat. No. 11,757, 400. The spacer is illustrated with fillets, i.e., rounded or radiused edges. This is optional. The edges can be non-radiused. The spacer can have substantially planar sides. The sides can be any shape that allow the spacer to perform the function described in this disclosure. The spacers shown throughout this disclosure are typically made of a rigid material such as aluminum, steel, brass, or hard thermoplastic. This allows the spacer to act as a rigid stop to prevent over tightening. It is possible to form the spacer from a partially compressible material, if that material allows the spacer to perform the equivalent function. Spacer 118, spacer 119, spacer 120, 121, of FIGS. 9, 20, 15, and 28, respectively, can be adapted to any of the modifications described in this paragraph. The various features are not necessarily mutually exclusive. For example, planar sides may be combined with a non-planar top. Non-planar sides can be combined with a planar top and so on.

The apertures within the spacers, for example, aperture 118*a* of spacer 118 of FIG. 9 is typically unthreaded. This may allow the threaded fastener to rotate within the spacer without turning the spacer. The spacer may alternatively be threaded and the spacer stop would prevent rotation.

The solar module frame illustrated throughout this disclosure is one example of a solar module frame suitable for attachment to the bracket body 113, clamp body 114, bracket body 115, and skirt clamp body 116 of FIGS. 8, 20, 14, and 28, respectively. Other examples of solar module frames suitable for use with the components in this disclosure include the frames of FIGS. 11, 15, and 19 of the Applicant's U.S. Pat. No. 11,757,400. The Inventors conceive that the system will integrate with other solar modules with frames that include a first detent in the outward-facing surface of their frame and a second detent extending from the return flange, or inward facing flange or lip of the solar module frame.

The solar module frames and module-roof attachment assemblies, module hook clamp, skirt clamp, and skirt splice, and other components in this disclosure are typically aluminum extrusions. Extruded aluminum is durable, electrically conductive, and can have enough strength for typical solar module systems. The Inventors conceive of extruding the solar module frames and module-roof attachment assemblies, module hook clamp, skirt clamp, and skirt splice, and other components from other electrically conductive materials or non-electrically conductive materials. They also conceive of using other manufacturing processes such as molding, 3D printing, or casting. Suitable materials could include steel or electrically conductive plastics, non-electrically conductive thermal plastic, or thermoset polyurethane.

FIGS. 33-56 illustrate an example of an assembly method where the solar module system was assembled row by row. The system is not limited to this assembly method. It can also be installed column by column following the same assembly principles. For example, an installer could preassemble the module hook clamps and module-roof attachment assemblies following step 200*a*, step 200*b*, and step 200*c* of FIG. 34. The installer can then follow steps 201-206 in FIG. 33, column by column rather than row by row. For example, the installer could optionally draw a reference line on the roof or building surface, and place the first instance of solar module assembly 173 as discussed for FIGS. 41 and 42. Before installing additional instances of solar module assembly 173 in the first row, the installer could finish installing all solar module assemblies in the first column. For example, they could install solar module assembly 174 as discussed for FIGS. 49, 51, 52, and 54. They would then repeat the procedure of installing additional instances of solar module assembly 174 in the same column until the column is completed. They would then repeat the installation procedure for the next column, starting with the next instance of solar module assembly 173 in the first row, followed by each instance of solar module assembly 174 until the column is completed.

The assembly procedure of FIGS. 33-56, illustrates module-roof attachment assembly 109 on the leading edge of the first row, for example in FIGS. 42 and 45. An installer may choose to use module-roof attachment assembly 108 in place of module-roof attachment assembly 109 on the leading-edge of the first row in the solar module system 100. Similarly, an installer may choose to use module-roof attachment assembly 109 on the trailing edge of the last row of the solar module system 100. The installer may also choose to use module-roof attachment assembly 109 on both the leading edge of the first row and on the trailing edge of the last row. The installer may opt to eliminate module-roof attachment assembly 109 completely and instead replace it with module-roof attachment assembly 108 on both the leading-edge and trailing-edge of the solar module system. All of these examples are within the scope of the disclosed solar module system and method. The method of FIGS. 33-56 illustrate an assembly with three rows. It is within the scope of this disclosure to create an assembly with two rows by following steps 200-204 for two rows. Alternatively, the installer could follow steps 200-202, skip steps 203 and 204, and proceed with steps 205 and 206.

Referring to FIGS. 5, 6, and 7, the solar module system is electrically bonded through bonding screws, threaded fasteners, and serrations. In FIG. 5, bonding screw 130 electrically bonds to the solar module frame 107 by piercing through paint or the oxide layer of the solar module frame 107, and electrically bonding the solar module frame 107 to the bracket body 113. Threaded fastener 127 electrically bonds roof attachment bracket 126 to bracket body 113, as does serrations 113v in the surface of bracket body 113 which mesh against serrations 126v in the surface of roof attachment bracket 126.

Similarly, bonding screw 150 electrically bonds to solar module frame 117 by piercing through paint or oxide layer of the solar module frame 117, and electrically bonds the solar module frame 117 to the clamp body 114. Bonding screw 129 bonds clamp body 114 to bracket body 113, and therefore, bonds the solar module frame 107 to the solar module frame 117, by piercing the oxide layer of clamp body 114, and bracket body 113.

In FIG. 6, bonding screw 140 electrically bonds to solar module frame 107 by piercing through paint or the oxide layer of the solar module frame 107, and electrically bonds the solar module frame 107 to the bracket body 115. Threaded fastener 137 electrically bonds roof attachment bracket 126 to bracket body 115, as does serrations 115v, in the surface of bracket body 115 which mesh against serrations 126v, in the surface of roof attachment bracket 126.

Referring to FIG. 7, bonding screw 160 electrically bonds to solar module frame 107 by piercing through paint or the oxide layer of the solar module frame 107, and electrically bonds the solar module frame 107 to the skirt clamp body 116. The threaded fastener 157 electrically bonds the skirt clamp body 116 to the skirt (not shown) by piercing through the oxide layer.

The bonding screws described above typically are threaded fasteners with sharpened tips that allows them to pierce the oxide or paint layers. These threaded fasteners are shown as pan-head self-tapping screws with Philips sockets. However, they can be any threaded fastener capable of creating electrical bonding between two electrically-conductive materials. For example, the threaded fasteners can be self-tapping screws, sheet metal screws, or self-drilling screws. Any head style can be used that allows the threaded fastener to tighten sufficiently to create an electrical bond. For example, the threaded fastener can be hex head, socket head, or pan-head. The socket can be Philips, Torx, hexagonal (i.e., Allen head), square, or Robertson.

Throughout this disclosure, unless otherwise indicated, reference to a roof type can equally apply to other building structures.

The variations described, the general principles taught, and undescribed variations, devices, and systems that encompass the general principles described in this disclosure, are within the claim's scope.

The invention claimed is:

1. A method for clamping a solar module to a roof, comprising:
securing a first hook of a first clamp arm and a second hook of a second clamp arm of a module hook clamp to a first solar module frame of a first solar module;
securing a module-roof attachment assembly to a second solar module frame of a second solar module; and
rotationally engaging a platform and a hook arm receiver of the module-roof attachment assembly with a hook arm and an open end of the hook arm of the module hook clamp, respectively.

2. The method of claim 1, wherein:
securing the first hook includes engaging a first detent in the first solar module frame with the first hook; and
securing the second hook includes engaging a second detent in the first solar module frame with the second hook.

3. The method of claim 1, wherein:
securing the first hook includes engaging a first detent positioned in an outward-facing surface of the first solar module frame with the first hook; and
securing the second hook includes engaging a return flange end of the first solar module frame with the second hook.

4. The method of claim 1, wherein:
rotationally engaging the platform includes rotationally engaging a generally curved-shaped seating surface of the hook arm with the platform.

5. The method of claim 1, wherein:
securing the module-roof attachment assembly includes securing a third hook of a first bracket body arm of the module-roof attachment assembly to a third detent of the second solar module frame; and
securing a fourth hook of a second bracket body arm of the module-roof attachment assembly to a fourth detent of the second solar module frame.

6. The method of claim 5, further comprising:
seating the second solar module frame against a spacer that is removably positionable between the first bracket body arm and the second bracket body arm.

7. The method of claim 1, wherein:
securing the module-roof attachment assembly includes securing a third hook of a first bracket body arm of the module-roof attachment assembly to a third detent in an outward-facing surface of the second solar module frame; and
securing a fourth hook of a second bracket body arm of the module-roof attachment assembly to a return flange end of the second solar module frame.

8. The method of claim 7, further comprising:
seating the second solar module frame against a spacer that is removably positionable between the first bracket body arm and the second bracket body arm.

9. The method of claim 7, wherein:
the module-roof attachment assembly includes a bracket body base;
the platform extends away from the bracket body base; and
the first bracket body arm and the second bracket body arm extend upward from the bracket body base.

10. The method of claim 1, wherein:
rotationally engaging the hook arm receiver includes rotationally engaging a ball hook catch with the hook arm receiver.

11. The method of claim 1, further comprising:
seating the first solar module frame against a spacer that is removably positionable between the first clamp arm and the second clamp arm.

12. The method of claim 1, wherein:
the hook arm receiver includes an end portion that extends toward the platform.

13. The method of claim 1, wherein:

the module hook clamp includes a clamp body base with the first clamp arm and the second clamp arm extending upward from the clamp body base and the hook arm extending away from and below the clamp body base.

14. The method of claim 1, further comprising:

securing a roof attachment bracket of the module-roof attachment assembly to the roof after securing the module-roof attachment assembly to the second solar module frame and before rotationally engaging the platform and the hook arm receiver.

\* \* \* \* \*